United States Patent [19]

Napor et al.

[11] 4,100,667

[45] Jul. 18, 1978

[54] METHOD AND MEANS FOR LOADING FILM CARTRIDGES

[75] Inventors: Carl A. Napor, Glen Ridge; Charles G. Krumm, Wyckoff; Joseph Kucich, Palisades Park, all of N.J.

[73] Assignee: Kahle Engineering Co., Union City, N.J.

[21] Appl. No.: 687,638

[22] Filed: May 18, 1976

[51] Int. Cl.² .............................................. B23P 21/00

[52] U.S. Cl. ........................................ 29/429; 29/430; 29/703; 29/711; 29/714; 29/792; 29/806

[58] Field of Search ................. 29/429, 430, 431, 701, 29/702, 703, 705, 709, 711, 714, 783, 792, 806

[56] References Cited

U.S. PATENT DOCUMENTS

| | | | |
|---|---|---|---|
| 2,824,360 | 2/1958 | Giboney | 29/714 |
| 3,364,551 | 1/1968 | Napor et al. | 29/783 |
| 3,457,627 | 7/1969 | Napor et al. | 29/806 |
| 3,596,340 | 8/1971 | Costa | 29/705 |
| 3,717,923 | 2/1973 | Arai et al. | 29/714 |
| 3,722,062 | 3/1973 | Gharaibeh | 29/783 |
| 3,742,586 | 7/1973 | Butler et al. | 29/806 |
| 3,930,296 | 1/1976 | Hoover | 29/711 |

*Primary Examiner*—Carl E. Hall

*Assistant Examiner*—Daniel C. Crane

*Attorney, Agent, or Firm*—Holland, Armstrong, Wilkie & Previto

[57] ABSTRACT

An improved method and machine are described for automatically loading a scroll of interwound photographic film and backing paper into a film cartridge. The cartridges are opened for scroll insertion by an initial relative movement of the cartridge halves in one direction and by a further separating movement in a differing direction. The machine has a rotatably mounted turret supporting a number of separate loading heads each of which supports a film cartridge and performs a two direction cartridge opening and closing action. The turret carries the heads through a series of stations where successive head loading, cartridge opening, scroll insertion, scroll to spool attaching, cartridge sealing, torque testing and winding, marking, and head unloading operations are performed. The heads and stations are controlled in their operation by a combination of direct cam control and multi-channel programable logic system control. The logic system channel inputs are fed by a resolver which is synchronized with the turret motion and by other sensors and cams to provide the logic system channel outputs for the timed loading head and station operating signals.

36 Claims, 53 Drawing Figures

Position 1.
Position 2.
Position 3+5
Position 6
Position 7
Position 8
Position 9
Position 10
Position 11
Position 12.

Fig.2.
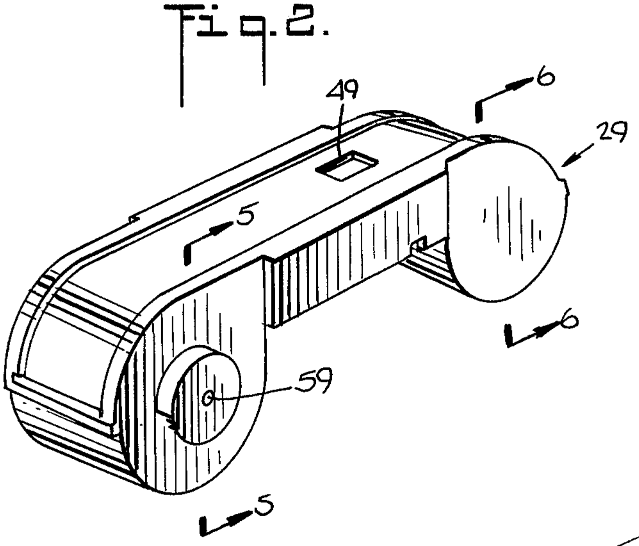
Fig.6.
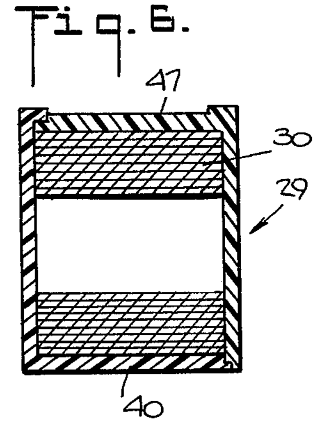
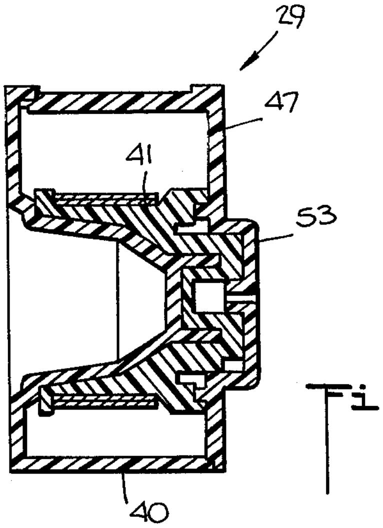
Fig.5
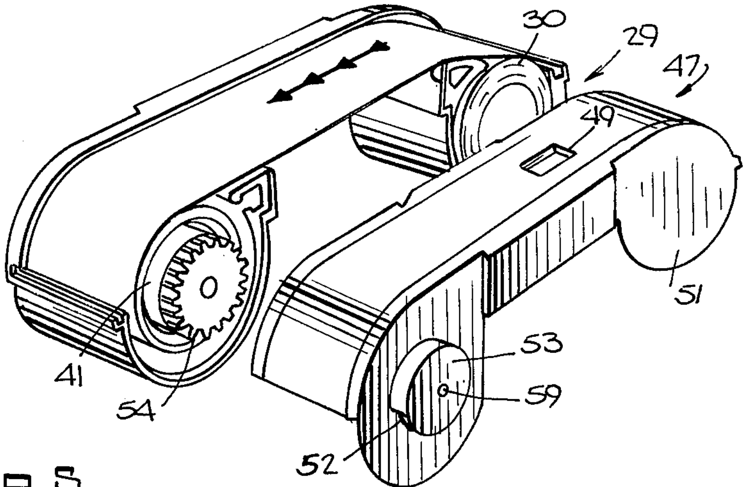
Fig.3.
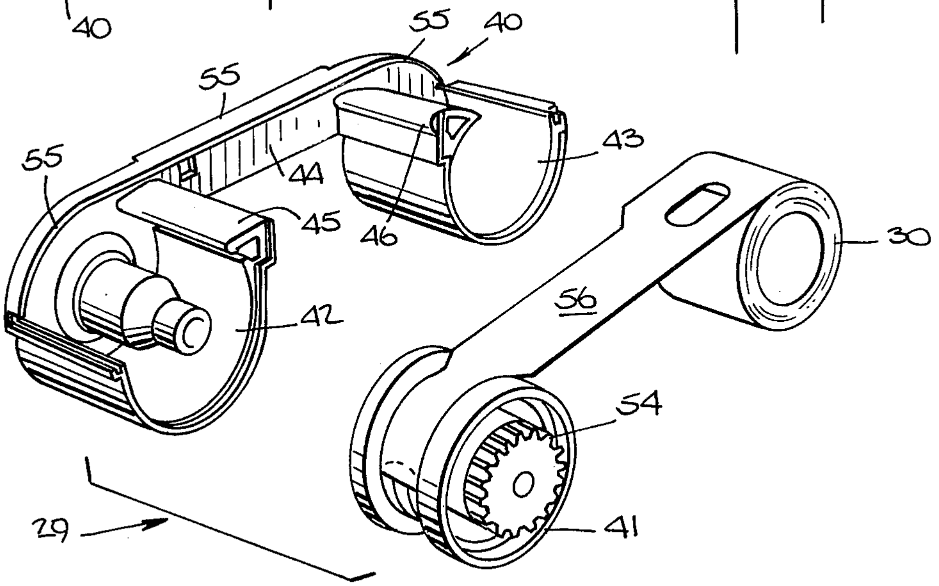
Fig.4.

106
125
125
29

12
12
100
29
103
101
105
13
13
106
102
125
108
29
106

118
119
120
114
115
117
121
132
113
130
129
128
126
125
111
127
107
106
29
116
108
110
109

107
100
106

112
29
100
112

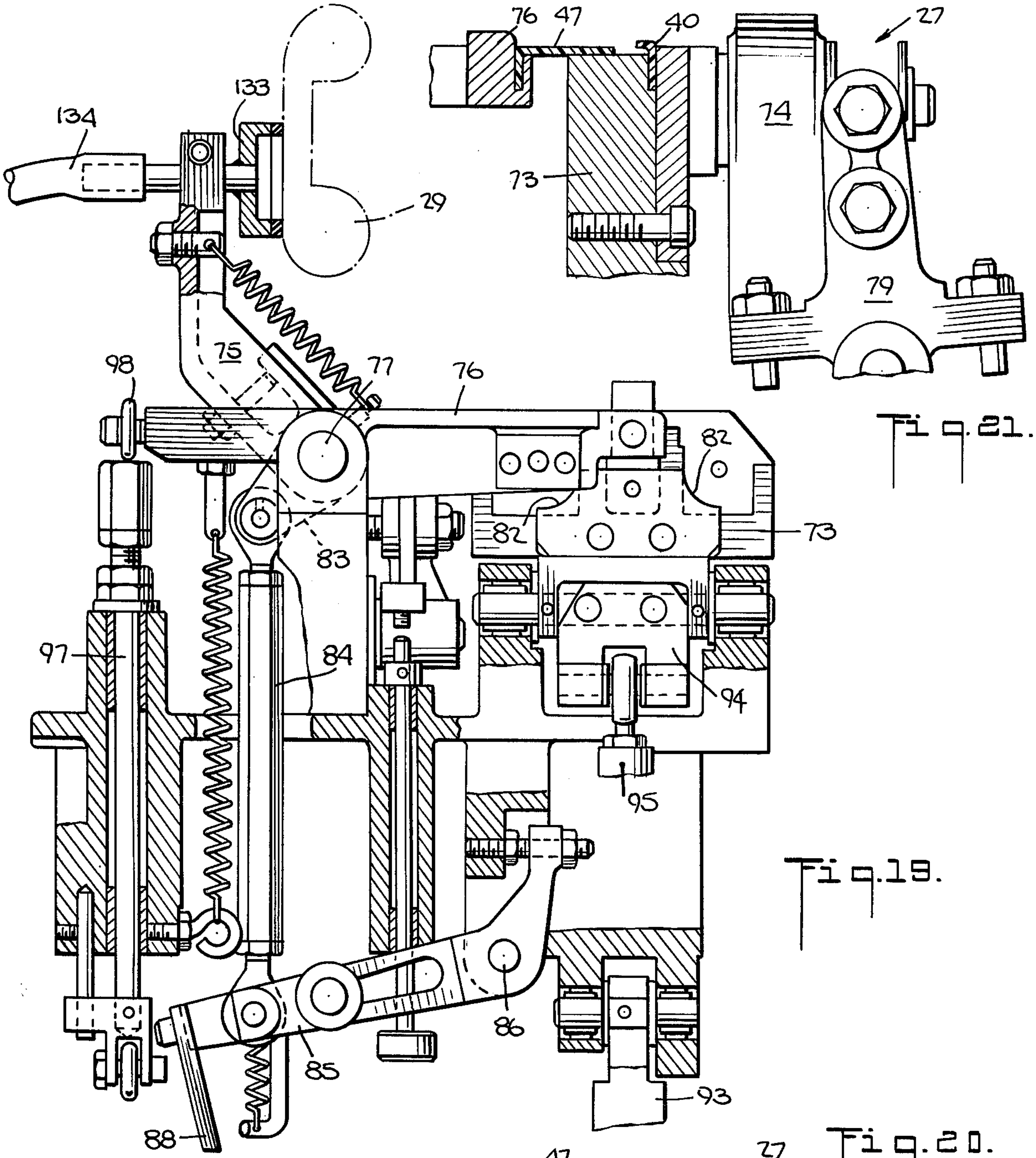
Fig. 21.
Fig. 19.
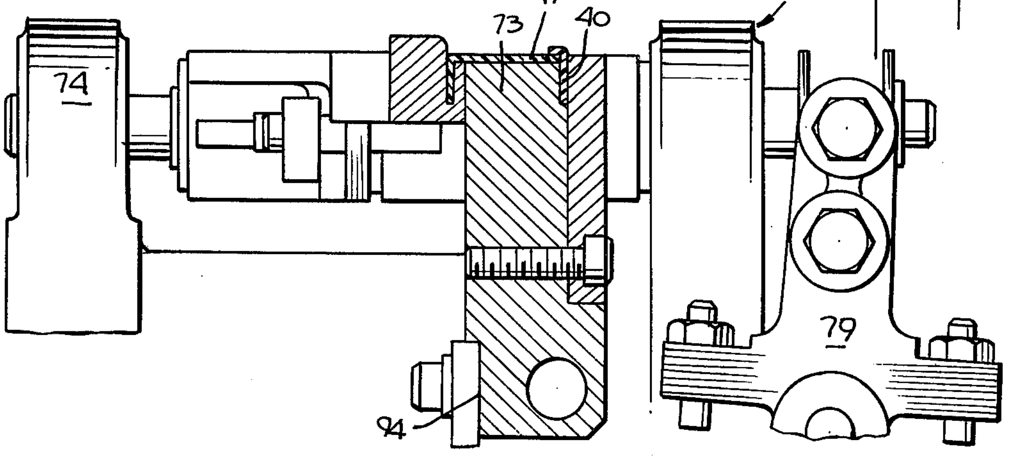
Fig. 20.

158
159
160
161
162
163
164
165
27
29
30
40
41
56
73
9

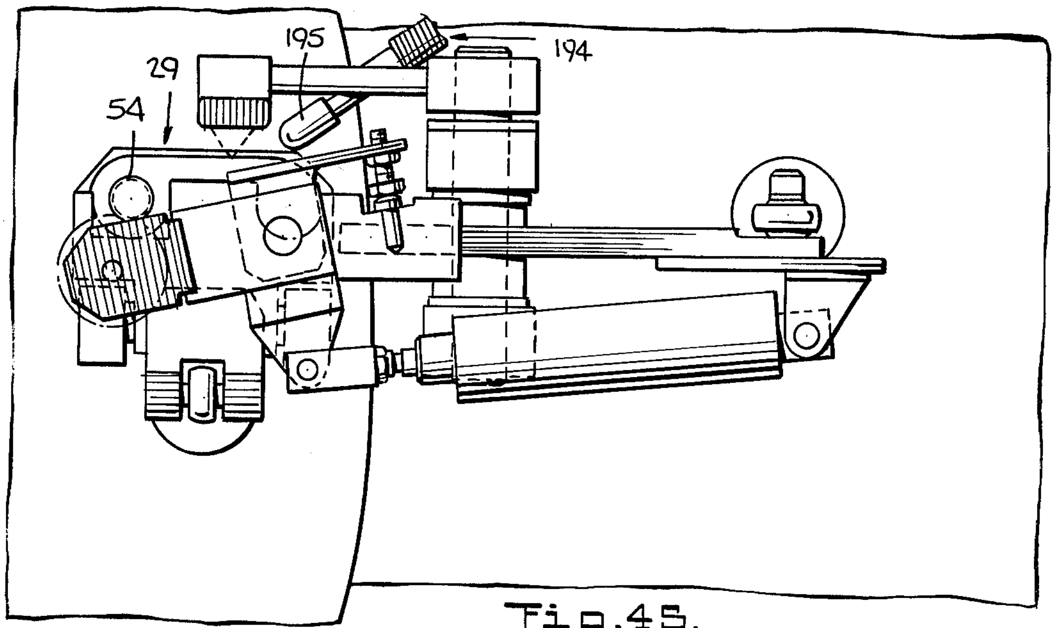
Fig. 45.
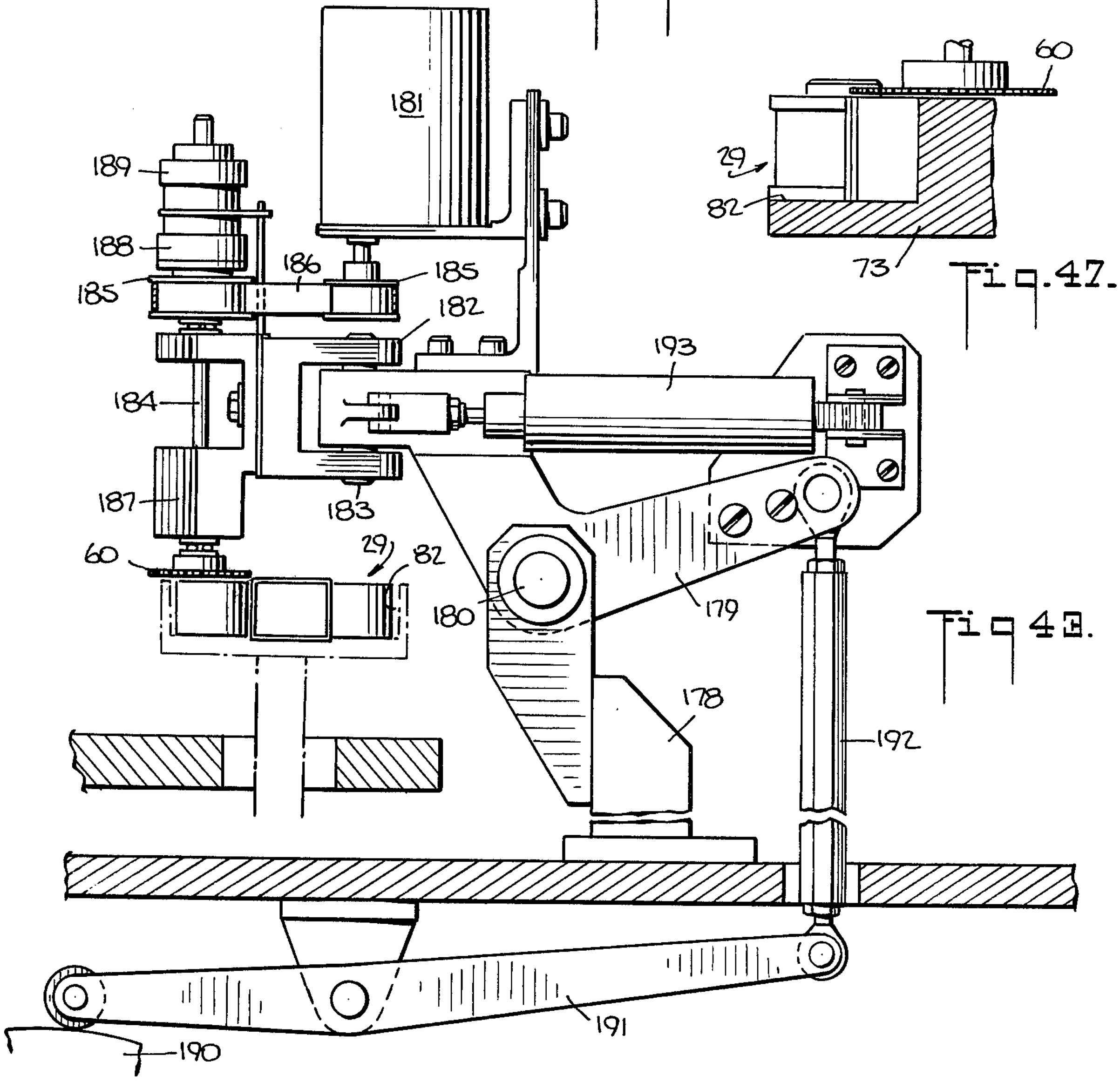
Fig. 47.
Fig. 48.

203
205
204
29
206
207
27
26
73

METHOD AND MEANS FOR LOADING FILM CARTRIDGES

BACKGROUND OF THE INVENTION

The present invention relates to high speed automatic film cartridge loading machinery and more particularly to an improved method and means for inserting an interwound film and backing paper scroll into a two-piece hollow cartridge.

The method and means of this apparatus are improvements upon prior automatic machinery, such as is disclosed in U.S. Pat. Nos. 3,364,552, 3,457,627 and 3,712,553. The apparatus and method of these prior patents was particularly adapted for handling hollow cartridges which were opened for loading by a one direction relative movement. The improved method and means of this present invention adopts the automatic method for differing cartridge design and also improves the machine timing and control operation using programable logic channels.

The machine has a stepped turret or head support which mounts a plurality of similar cartridge loading heads and which moves the heads successively to a series of work stations. At an initial station, the closed but unsealed cartridges are fed into the heads. The turret then carries the heads to spaced operating positions. The heads open the cartridges and present them to scroll transfer positions, scroll detecting and attaching positions, cartridge closing and sealing positions, winding and torque test position, and marking and unloading positions. Means including a resolver and a programable logic system are employed at the several stations for timing and for initiating and for checking the various operations at the loading positions.

Accordingly, an object of the invention is to provide an improved apparatus and method for the high speed and automatic loading of film cartridges.

Another object of the present invention is to provide a film cartridge loading method and apparatus for loading two-piece cartridges which are opened and reclosed by manipulating the cartridge halves in two directions.

Another object of the present invention is to provide an improved control means for an automatic cartridge loading apparatus.

Another object of the present invention is to provide a cartridge loading machine wherein various related operations are controlled by a programable logic controller and where a number of timing and testing and position sensing signals are utilized in the logic program for controlling the machine operation.

Another object of the present invention is to provide an improved electronically controlled cartridge loading machine incorporating an interconnected resolver, electronic limit switch, and programmed logic control.

Another object of the present invention is to provide an improved control system for an automatic film cartridge loading machine incorporating a programable logic controller with a separate logic package for controlling the timing.

Another object of the present invention is to provide an automatically indexing cartridge loading machine incorporating an interconnected and synchronized resolver for timing control.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification wherein:

FIG. 3 is an exploded perspective view of a loaded cartridge.

FIG. 4 is an exploded perspective view illustrating the body portion of the cartridge and the take-up spool and the paper and film scroll.

FIG. 5 is a vertical sectional view taken along line 5—5 on FIG. 2.

FIG. 6 is a vertical sectional view taken along line 6—6 on FIG. 2.

FIG. 7 is a fragmentary perspective view of the turret loading position of the apparatus in accordance with the present invention.

FIG. 19 is a side elevational view, partially in section, of a cartridge loading head illustrating the cartridge open position.

FIGS. 20 and 21 are fragmentary front elevational views of the cartridge loading head illustrating the cover shifting mechanism.

FIG. 43 is a side elevational view of the wind-up and torque testing position 10 in the winding mode.

FIGS. 44 and 45 are top plan views showing the wind-up and torque testing apparatus in successive positions.

FIG. 47 is an enlarged detailed view of the winding gear at the torque testing position 10.

FIG. 53 is a diagrammatic illustration of the timing system.

DESCRIPTION OF THE PREFERRED EMBODIMENT

Figure 9:
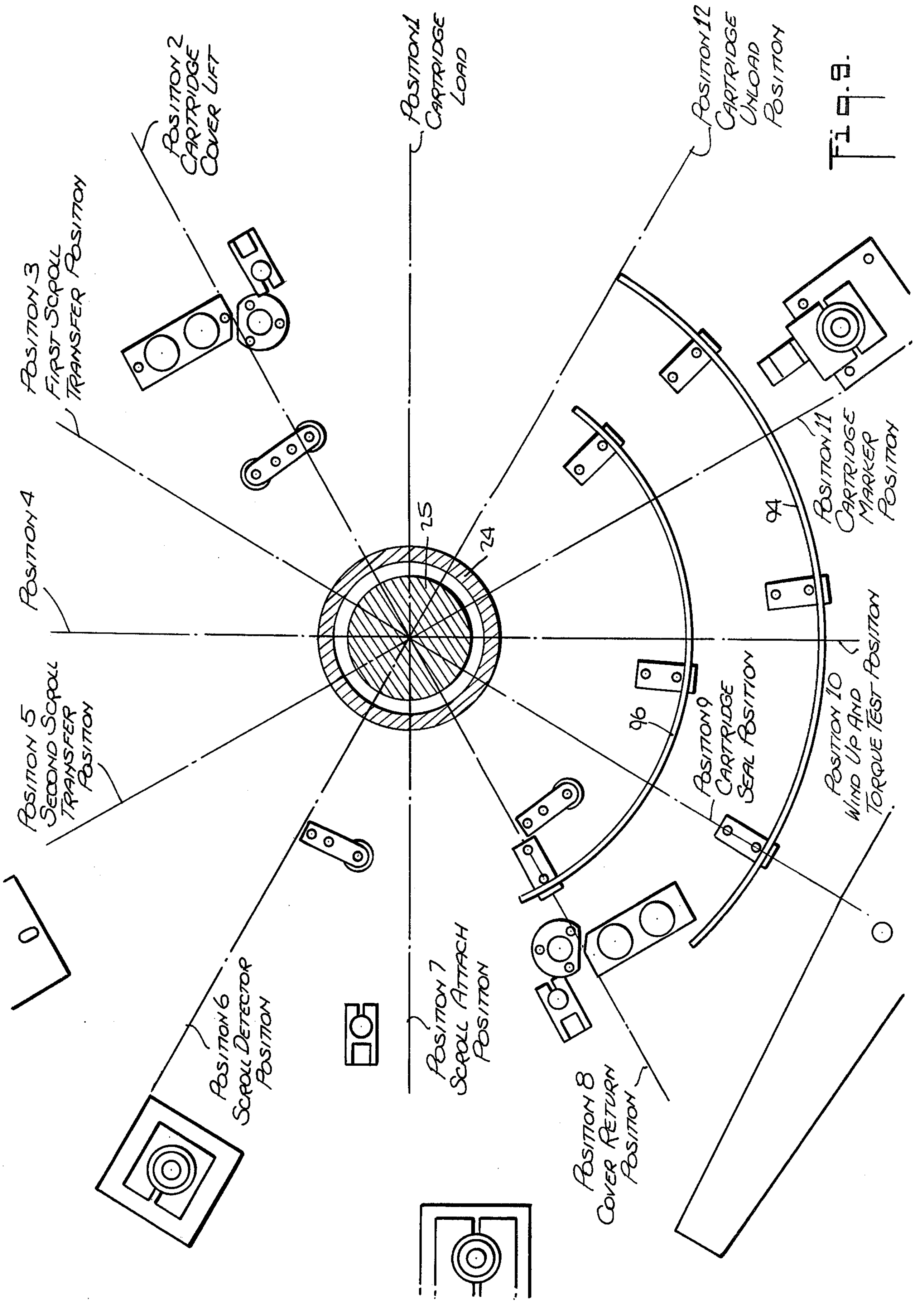
FIG. 9 is a diagrammatic view illustrating the twelve stations or positions for the apparatus and method of the present invention.
Figure 10:
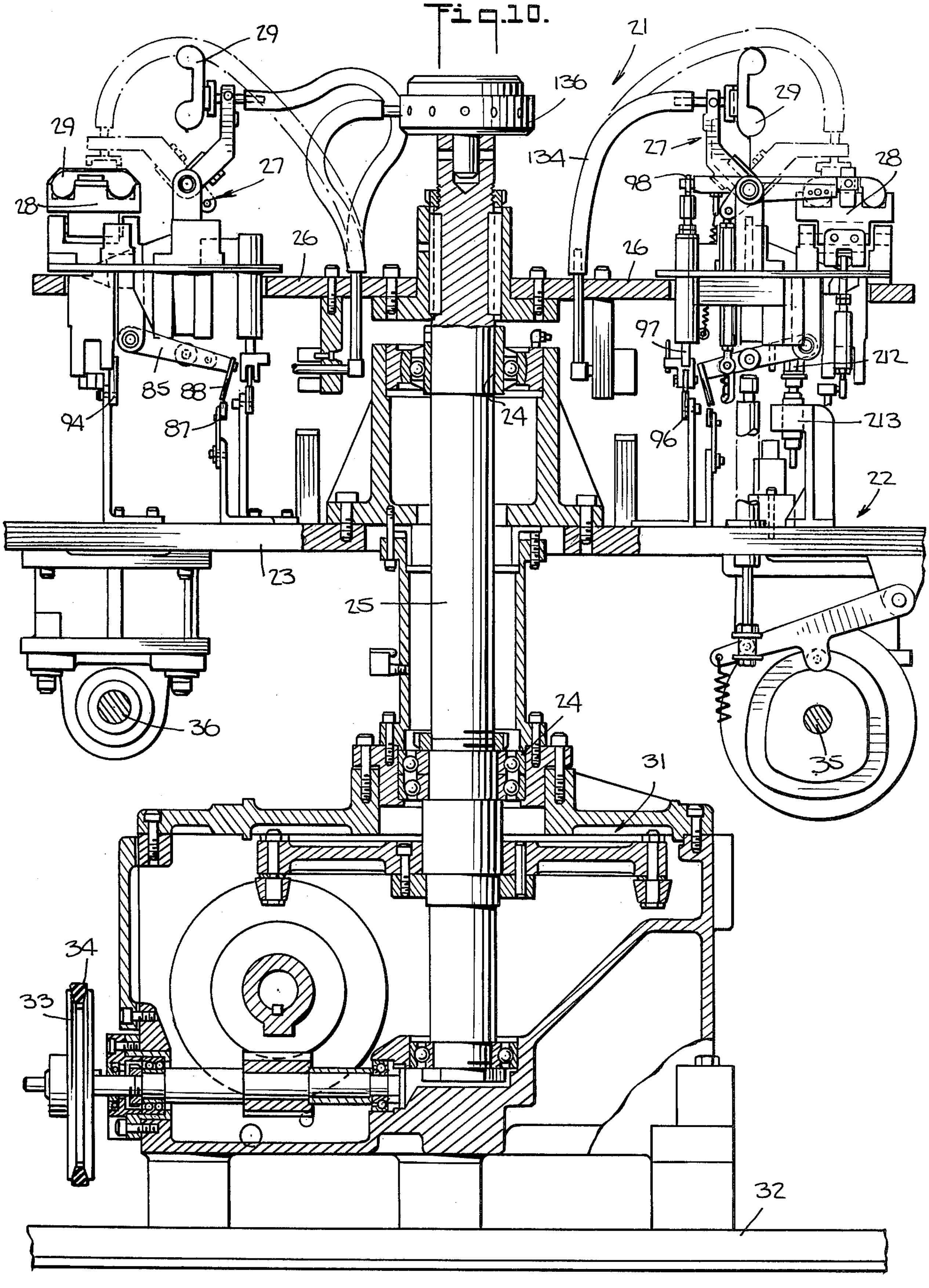
FIG. 10 is a vertical sectional view of a preferred embodiment of the turret of the cartridge loading apparatus in accordance with the present invention.

The cartridge loading machine will first be described generally with particular reference to the diagrammatic illustration in FIG. 9 of the cartridge loading operations at each of the twelve loading positions together with FIGS. 7 and 10 illustrating the principal portions of the machine.

As illustrated in FIG. 10, the machine 21 comprises a support table 22 having a flat top plate 23 supported on suitable legs (not illustrated). At the center of the table 22, bearings 24 are mounted to rotatably support a verticle turret support shaft 25 on the top of which is mounted the generally circular turret 26. Twelve identical loading heads 27 are detachably mounted around the outer edge of the turret 26 which include support nests 28 for the plastic cartridges 29 and which manipulate the cartridges 29 as they are loaded with paper and film scrolls 30 and are sealed in the manner which will be described below.

The basic machine movement is provided by the turret 26 which steps the heads 27 successively to the twelve work positions located around the edge of the turret 26 and which perform the cartridge loading, sealing, and testing operations. The stepped movement of the turret 26 is provided by a conventional roller cam drive 31 mounted on a base plate 32 on the table 22. The drive 31 is powered by a suitable electric drive motor through the intermediation of a drive pulley 33 and drive belt 34. Continuous rotation of the drive pulley 33 by the electric drive motor during the machine operation causes the intermittent stepped motion of the turret 26 as, for example, a 30° advance of the turret 26 each three seconds with a substantial portion of the three second period being available for the performance of the cartridge loading operations as the turret 26 remains in a dwell or rest period between the stepped advances. As will be described further below, a number of the loading operations are performed by cam actuated or cam driven devices controlled by cams mounted on two horizontal cam shafts 35 and 36 rotatably mounted on the underside of the table top 23. The cam shafts 35 and 36 are driven in synchronism with the turret turning drive so that the positions of the cams are coordinated with the turret 26 movement and so that an exact timing is provided for the cam actuated operations as related to the turret 26 advance and dwell periods.

Figure 1:
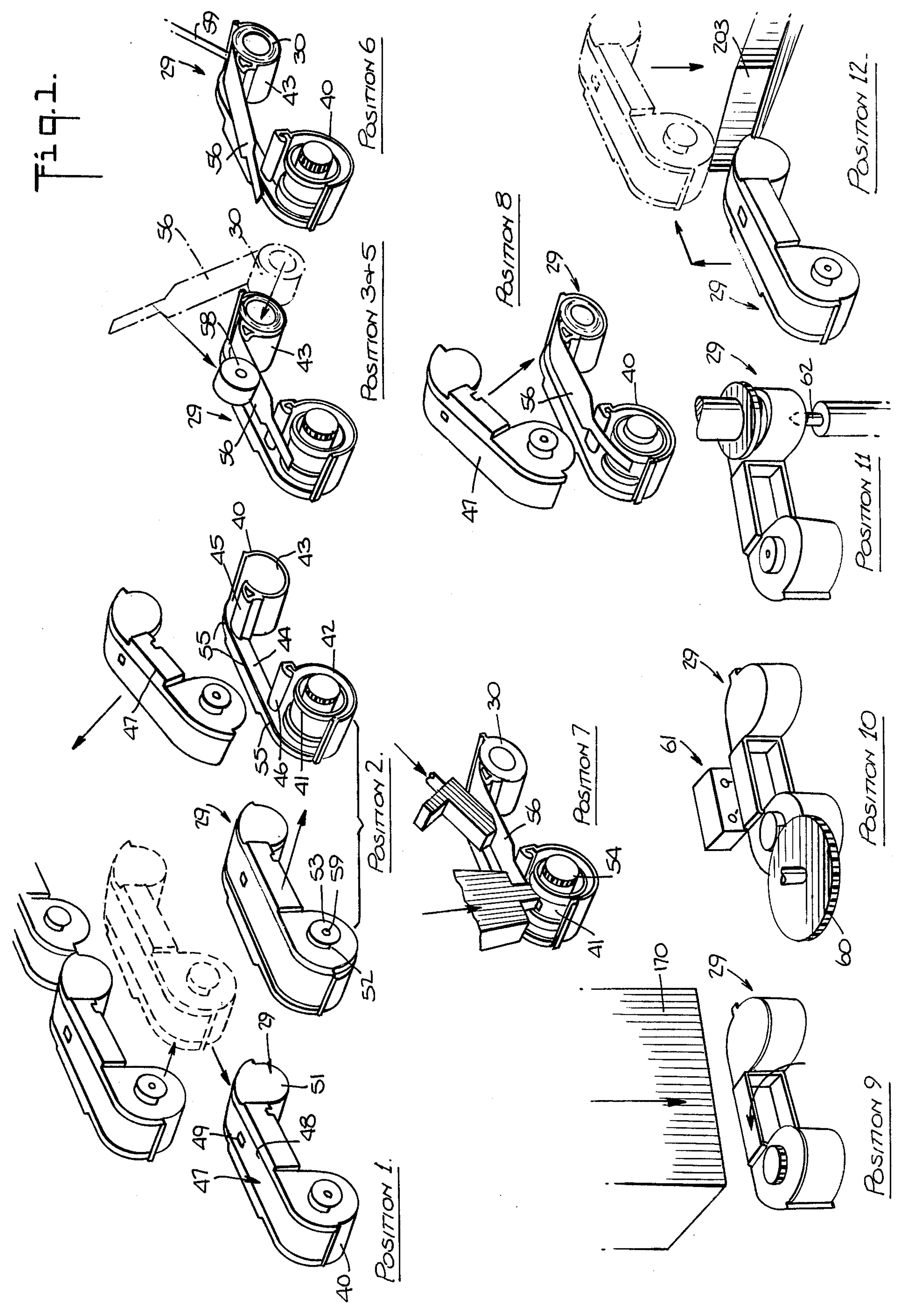
FIG. 1 is a diagrammatic illustration of the several steps performed by the apparatus of the invention in loading a film cartridge with a film scroll.
Figure 2:
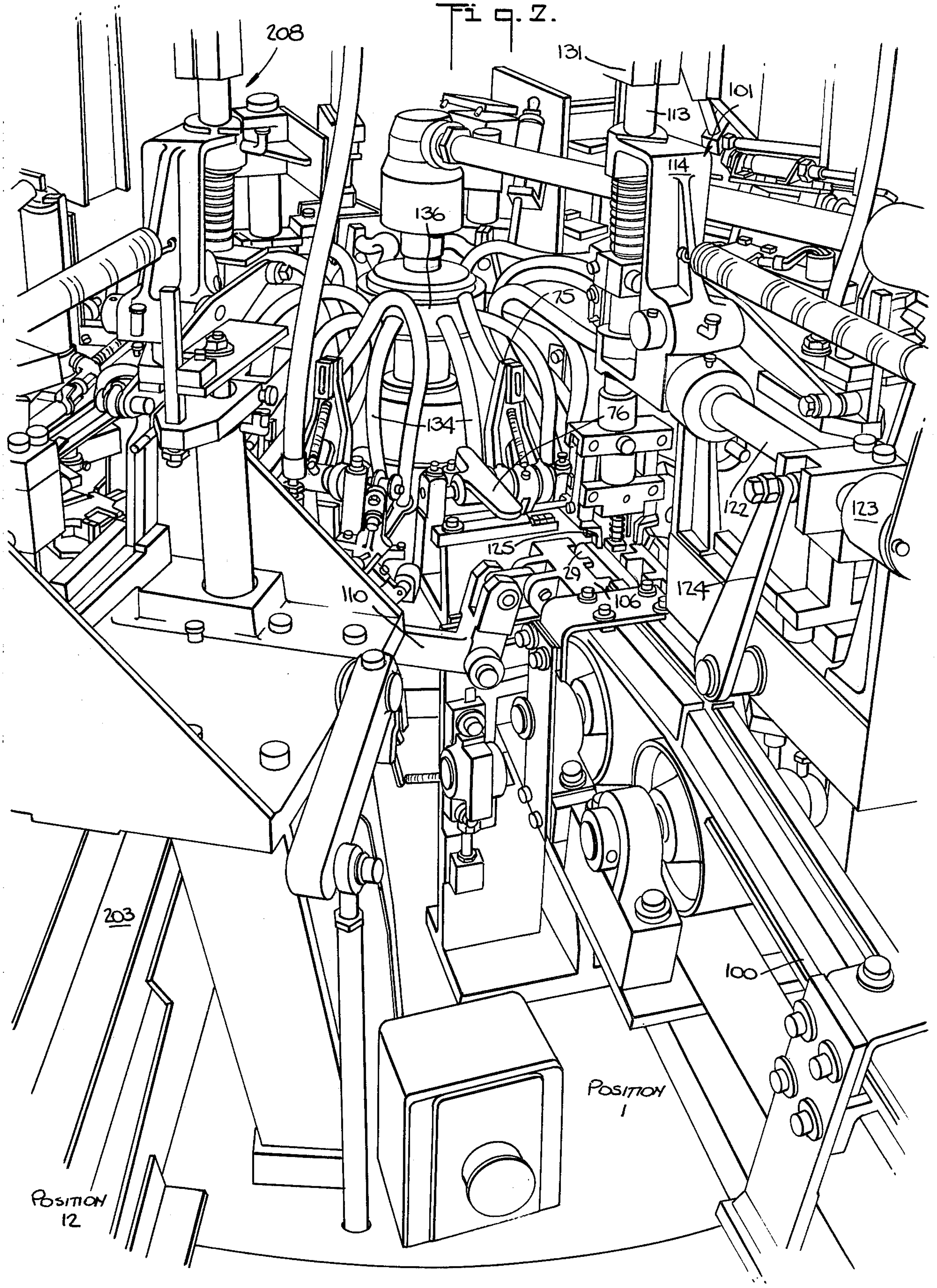
FIG. 2 is a perspective view of a film cartridge of the type loaded by the method and apparatus of the invention.

The diagrammatic plan view of FIG. 9 shows the twelve turret positions or stations to which the heads 27 are successively moved by the above described turret 26. FIG. 1 illustrates in perspective, the successive steps of the cartridge loading operation which take place at the twelve positions 1–12. These loading operations and the cartridge 29 will next be described in a general way with particular reference to FIGS. 1 and 9 and a more detailed description of each of the positions 1–12 will then be given below under appropriate headings.

The Cartridge and Loading Operations

In order to clarify the following description of the preferred embodiment of the cartridge loading machine, a cartridge 29 will be first described with particular reference to FIGS. 2 through 6. The cartridge 29 has a body 40 which contains a take-up spool 41 in a take-up compartment 42 and has a second spaced supply compartment 43 which receives the film scroll 30. A rail portion 44 connects the two compartments 42 and 43 and the film extends from the scroll 30 to the take-up spool 41 over spaced ledges 45 and 46. The cartridge 29 is sealed with a cover 47 which includes a back wall 48 having an exposure indicating aperture 49 and has end walls 50 and 51 for sealing the open outer ends of the body take-up and supply compartments 42 and 43. The end wall 50 has an opening 52 in a protruding gear cover 53 which exposes the spool drive gear 54. An aperture 59 is also provided in the gear cover 53 to admit a spool positioning member or air blast. Lip members 55 on the rail 44 and compartments 42 and 43 receive the adjacent edges of the cover 47 back wall 48 in the assembled cartridge 29. The cover 47 is applied to the body 40 with a motion in the direction of the spool 41 or compartment axis 42 during cartridge assembly to insure the engagement of the cover 47 back wall 48 with the lip members 55 of the body 40. As the cartridge 29 is loaded, the scroll 30 of interwound film and backing is positioned in the supply compartment 43 with the cartridge cover 47 removed and the scroll leader 56 has its end moved against and fastened to the spool 41. The cover 47 is then replaced and is fastened to the body 40.

The loading operation of the cartridge 29 will now be described in a general manner with particular reference to the diagrammatic illustrations of the cartridge loading steps in FIG. 1. Each of the operations is performed while a cartridge 29 is supported on a nest 28 in a separate cartridge loading head 27. FIG. 1 illustrates the position of the cartridge 29, during the loading operation and the preferred structure of the nest which moves the cartridge through several positions illustrated will be further described below.

Position 1 at the cartridge loading turret 26 is the head loading position. At this position, the endmost cartridge 29 of a line of cartridges on an in-feed conveyor is moved into a nest 28 in a head 27 with the cartridge 29 assembled with its cover 47 in place on the cartridge body 40.

In position 2, the cartridge 29 is opened using two principal cover 47 motions. The first motion carries the cover 47 in an axial direction (arrow 57) to move its edges clear of the body lip members 55. Thereafter, as illustrated for position 2, the cover 47 is moved clear of the body 40 as, for example, in a generally vertical direction clear of the opened ends of the body compartments 42 and 43.

Positions 3 and 5 are identical scroll loading positions. Scrolls 30 are moved axially into the supply compartment 43 from a suitable first scroll winding or supply machine at position 3 and into alternate heads from a second scroll winding or supply machine at station 5. A scroll 30 positioning roller 58 is moved against the scroll leader 56 to position the scroll 30 within the body 40 with the leader 56 adjacent to the spool 41 for subsequent attachment.

Position 4 is available as an extra loading or check position or spacing position.

At position 6 a test is made to make sure that each cartridge body 29 has a film scroll 30 using a sensing probe 59 or other scroll sensing device.

At position 7 the leader 56 is held against the spool 30 while the leader 56 is welded or otherwise fastened to the spool 30.

At position 8 the cover 47 is reapplied with two separate motions reversing the opening movements of position 2. The cover 47 is first swung back with the cover end walls 50 and 51 positioned outwardly of the opened ends of the body compartments 42 and 43. Thereafter, the cover 47 is moved axially towards the body 40 so that the cover edges move under the lip members 55 of the body 40.

At position 9, the reclosed cartridge 29 is turned on its side and the cover 47 is fastened to the body 40.

At position 10, a wind-up gear 60 engages the spool drive gear 54 to provide an initial wind-up moving the film to its start position under the control of a photoelectric means 61 which scans indices on the film backing strip through the cover aperture 49. This position also checks the scroll torque as an excess torque prevents a timely wind-up thereby generating a cartridge reject signal, as described further below.

At position 11, a marking device in the form of an embossing member 62 lightly marks every other cartridge to identify whether the loaded cartridges 29 were fed at position 3 or position 5. This permits checking of the correct scroll winding machines in the event of scroll winding errors.

At position 12, the loaded magazines 29 are lifted out of the nests and are dropped into a cartridge discharge chute with separate chutes for good and reject cartridges.

The Machine Timing and Logic Control System

As heretofore described, the machine 21 completes film cartridges 29 by inserting a film scroll 30 into the cartridge 29 and then sealing the cartridge 29 and winding the scroll 30 to a start position. This overall operation is performed as the machine 31 moves each cartridge 29 through a number of separate operating positions using a turret for carrying the cartridges and where the necessary steps are performed in sequence. Since the operation is automatic, all of the operations are performed in a closely timed sequence of operations with a number of checks or test procedures being carried out incident to the several steps assure that correctly loaded cartridges are produced by the machine.

The timing system (FIG. 53) is provided by a programmable logic control 13 whose operation is synchronized with the machine 21 operation by an electronic limit switch 14, a number of machine operated direct sensors or switches on the machine 21, and a few operator controlled switches or controls 15.

The programmable logic control or PLC 13 has a number of operating channels whose output signals are programmed to operate the various elements of the machine, such as the drive cylinders and operating solenoids, etc., as described below in the detailed description of the operating positions. During the course of each index of the machine turret 26, the PLC channels are addressed in the proper order through the electronic limit switch 14 from a resolver 16 which is mechanically coupled to the machine turret indexing drive to provide a signal proportioned to the elapsed time in the indexing period. The generation of the control signals by the PLC channels is performed in proper sequence with the machine indexing because the resolver 16 is physically coupled to the machine indexing drive providing one resolver cycle for each complete cycle of the turret indexing drive.

For each indexing cycle of the machine 21, a first indexing period is provided on the resolver 16 for the first 75°, for example, which is set aside for the physical indexing of the turret. Thereafter, the remaining 285° of the resolver cycle is used for the sequential and successive addressing or activation of the various PLC channels at the proper intervals of the indexing cycle using the commercially available electronic limit switch 14 to couple the resolver 16 output to the PLC13.

In addition to the main timing or PLC channel address signals from the resolver 16, the system advantageously permits the entry of one or more additional simultaneous control signals to the channels from machine activated switches or sensors. For example, where the point in the indexing cycle is reached where a cover lifting or other operation might be ordered at a certain position, a secondary over riding signal may be entered into the PLC program for that channel which overrides or alters the control signal. Where a cover lift signal would normally be addressed to a channel, the secondary over riding no lift signal may be applied to that channel from a direct cover sensing device showing that there is no cover or magazine present at that position to be lifted so that a vacuum control valve portion of the cover lift should not be activated. Similarly, a signal to the cartridge sealing position for performing the cartridge sealing operation may be overridden or altered by a simultaneous signal addressed to that PLC channel indicating that there is no cartridge in that particular head to be sealed or that there is no scroll present in the particular cartridge 29 at the sealing head.

The programable logic system 13 may be commercially purchased and they are well known. These available logic circuits have a number of channels which are set up to provide an output control signal in accordance with a variety of inputs from resolvers or photocells or switches or other sensing or input devices. The description of the several operating positions of the machine will make reference to the use of the resolver 16 and the PLC13 and the necessary detecting or addressing devices present at the positions to provide the inputs for the operating results.

In addition to the operation principally controlled by the PLC 13, an additional number of functions at the various positions are controlled from direct mechanical cams driven in synchronism with the turret indexing drive. These cams not only provide certain mechanical drives directly, as described below, but also include cams which operate air motors through cam controlled air valves and also provide switch actuated signals for certain of the PLC13 channels.

The cartridge loading machine 21 operates in combination with scroll winding machines which feed wound scrolls 30 at certain loading positions in the manner described below. The resolver 16 is useful for providing timing signals together with the PLC13 for synchronizing the operation of the scroll winding machines or other related equipment. For example, the scroll winding machine may use a digitally controlled servo system for controlling the length of the wound scrolls. The servo control signal may be generated by the PLC 13. Should the servo system require command signals of differing pulse length or frequency from those used between the PLC 13 and the loading machine 21, a suitable interface, such as a transistor transistor logic (TTL) interface 17, may be inserted between the PLC 13 and the servo 18 or other controlled system.

The Cartridge Loading Heads

Each of the cartridges 29 is carried from position to position during cartridge loading operation in an individual cartridge loading head 27. A numbeer of these heads 27 are mounted on the periphery of the turret as, for example, twelve heads mounted on the turret for presentation to the twelve spaced cartridge loading positions 1 through 12.

Each of the cartridge loading heads 27 supports and manipulates the cartridge body 40 and cover 47 so that the above described loading steps may be carried out at the several positions in the proper sequence.

A preferred embodiment of a cartridge loading head 27 will now be described in detail with particular reference to FIGS. 16 through 22.

Each cartridge loading head 27 has a molded head frame 70 which is detachably mounted on the turret 26 with suitable bolts 71 so that the head 27 may be removed for repair or inspection and replaced as necessary. The frame 70 includes spaced bearings 72 for pivotally mounting the cartridge nest plate 73 as well as spaced bearings 74 for pivotally mounting the cartridge cover lift arm 75 and the cover shift arm 76 or a lift arm shaft 77. Additional integral bearings are formed as a portion of the molded head frame which include a bearing 78 for mounting a lift arm shaft 77 shift arm 79 and a bearing 80 for a cartridge cover clamp 81 which is operative at position 9 during the cover sealing operation. The cartridge nest plate 73 includes a shaped cartridge receiving nest 82 which positions the cartridges 29 by receiving and locating their rounded compartment portions 42 and 43. The lift arm shaft 77 is turned to move the lift arm 75 toward and away from the cartridge nest 82 through the intermediation of a crank 83 (FIG. 19) on the lift arm 75 and coupled through a link 84 to a cam actuated drive lever 85 pivotally mounted at 86 on the turret 26. At the cover opening and closing stations, the lift arm 75 is lowered during the dwell time for the turret 26 at these positions by a cam wheel 87 (FIG. 10) engaging a cam surface 88 attached at the end of the cam drive lever 85. A vacuum system, further described below, holds the cover 47 on the arm 75.

Prior to the lifting of the cover 47 on the lift arm 75, it is necessary to move the cover 47 axially of the cartridge 29 to disengage the cover edge from the body lips 55. This motion is provided for by moving the shift arm 76 together with its supporting shaft 77 axially through the intermediation of the shaft lift arm 79. A pair of shift rods 89 and 90 (FIG. 17) slidably mounted in bearings 91 and 92 on the loading head 27 rock the shift arm 79 back and forth to move the cover shift arm 76 to and from its cover release position. Air cylinders at the cover lift position 2 and the cover return position 8, further described below, move the shift rods 89 and 90.

The cartridge supporting nest plate 73 is swung from its normal vertical cartridge loading position to a generally horizontal cartridge sealing position at positions 9, 10 and 11 through the intermediation of a cam crank 93 coupled to a bearing block 94 on the nest plate through an adjustable linkage 95. The cam crank 93 is swung to and from its tilted position through the intermediation of an elongated stationary cam 94 as illustrated in FIGS. 9 and 10. The cam 94 extends through stations 9, 10 and 11 to hold the nest plate 73 in its horizontal or tilted position at these three stations where the cartridge 29 is successively sealed, torque tested, and marked.

At positions 9, 10 and 11, the cartridge nest plate 73 is swung to a horizontal position to place a side of the cartridge 26 uppermost for cartridge sealing and testing operations. This is done by the cartridge nest plate tilting mechanism described above. In order to permit this tilting action, it is necessary that the cartridge cover shift arm 76 be moved clear of the cartridge cover. For this purpose, the cartridge cover shift arm 76 is pivotally mounted on the lift arm shaft 77. The cartridge engaging outer end of the shift arm 76 is lowered through the intermediation of an elongated stationary cam 96 (FIGS. 9 and 10) which raises the inner end of the shift arm 76 as a vertical cam follower arm 97 slidably mounted on the turret 26 engages a roller 98 positioned at the inner end of the shift arm 76.

The Cartridge Loading Position 1

The cartriges 29 are continually fed to the cartridge transfer position 1 by a continuously running conveyor 100 which supplies a line of closed but unsealed cartridges 29 each containing a film spool 41. The cartridges 29 are intermittently lifted from the conveyor 100 and placed in a nest 82 in a cartridge loading head 27 by the transfer mechanism 101 which will now be described in detail with particular reference to FIGS. 7 and 11-15.

Figures 11, 15:
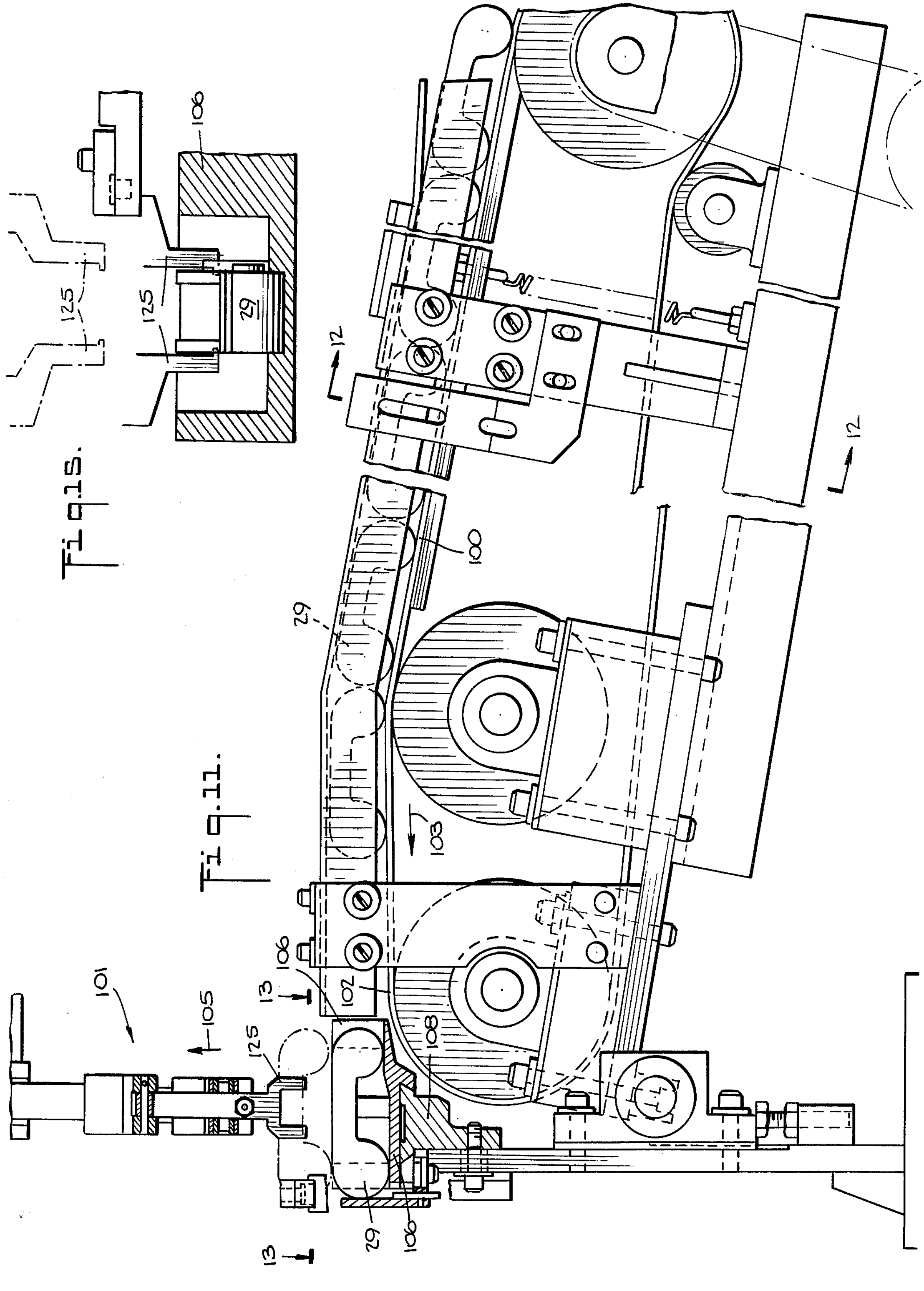
FIG. 11 is a side elevational view partially in section of a preferred embodiment of the cartridge feed for the cartridge loading position 1.
FIG. 15 (sheet 7) is an enlarged detailed view illustrating the cartridge gripping jaws of the cartridge transfer means.

The transfer position 1 illustrated in FIG. 11 shows the discharge end 102 of the continuously running conveyor 100 which carries a line of the cartridges 29 to the transfer mechanism 101.

FIG. 11 is a vertical sectional view including the discharge end 102 of the conveyor 100 and the transfer mechanism 101. In FIG. 11, the conveyor 100 is moving in the direction of the arrow 103 for moving the endmost cartridge 29 to a pick-up platform 106. The transfer mechanism shown generally at 101 lifts this cartridge 29 vertically in the direction of arrow 105 and thereafter transfers it horizontally to a position above the cartridge nest 82 in a cartridge loading head 27 on the turret 26. The cartridge nest 82 receives the cartridge 29 when the cartridge 29 is released by the transfer mechanism 101.

Figures 12, 13, 14:
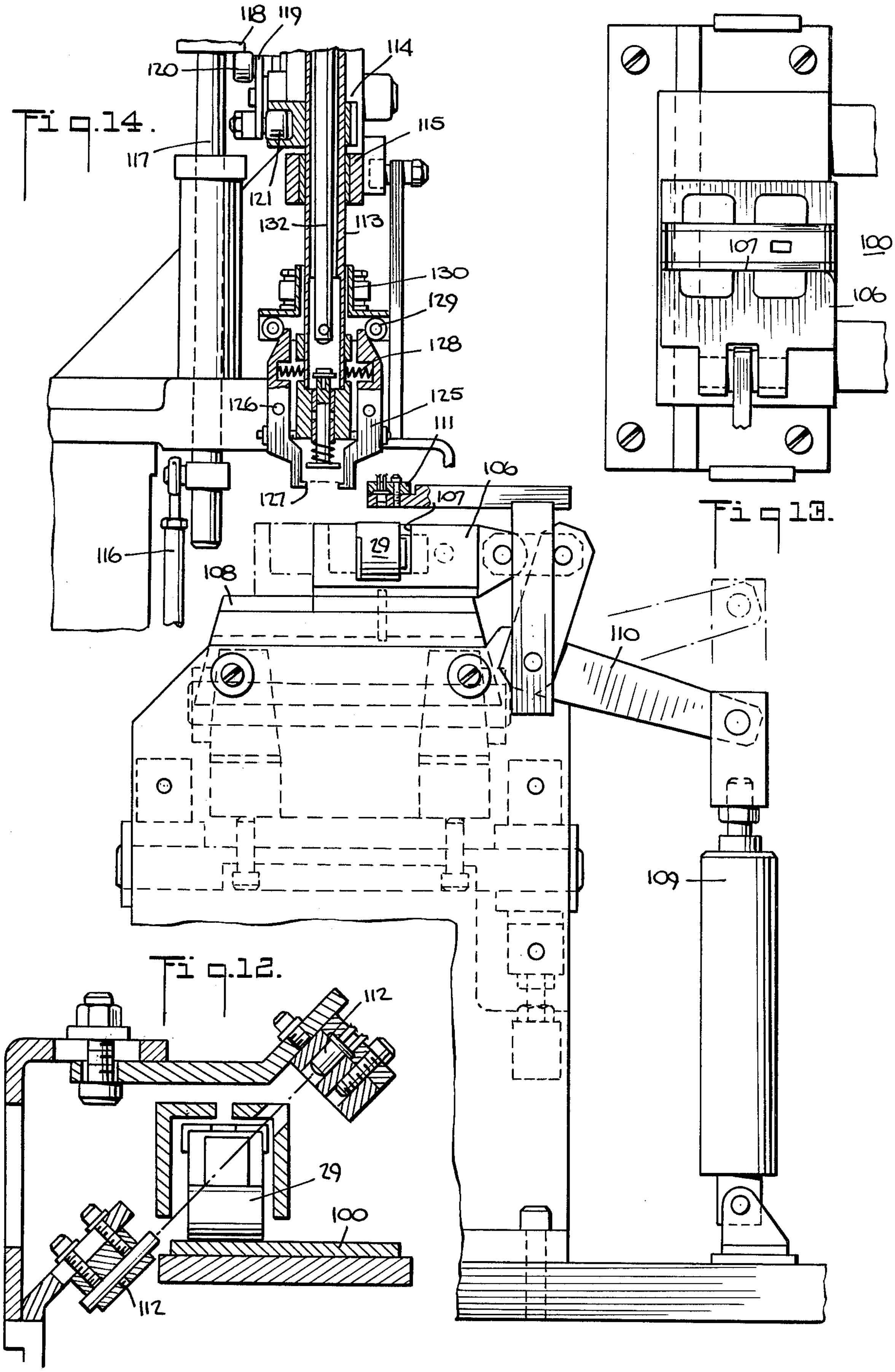
FIG. 12 is a vertical sectional view taken on line 12—12 on FIG. 11.
FIG. 13 is a horizontal sectional view taken along line 13—13 on FIG. 11.
FIG. 14 is an elevational view, partially in section, illustrating the cartridge transfer means at the cartridge loading position 1.

The transfer of each cartridge 29 from the conveyor 100 to a loading head 27 is facilitated by a platform 106 positioned between the end of the conveyor 100 and the turret 26. The platform 106 has a cartridge receiving slot 107 as best illustrated in FIG. 13. The endmost cartridge 29 on the conveyor 100 moves into the slot 107 when the platform 106 is in a cartridge receiving position as illustrated in FIG. 13. Thereafter, the platform 106 is moved transversely of the conveyor 100 on a track member 108 to position a cartridge below the transfer means 101. The drive means for moving the platform 106 is illustrated in FIG. 14. It comprises a drive cylinder 109 operatively coupled to the platform 106 by a crank member 110. The drive cylinder 109 is activated at the proper time for the shift by a photoelectric sensor 111 which is energized when a cartridge enters a platform 106. This signal is sent through an appropriate channel in the above described logic system.

FIG. 12 illustrates a photoelectric detector 112 mounted at the feed conveyor 100 to generate a machine cut-off signal in the absence of cartridges on the conveyor 100. The output of the photocell 112 is fed to the logic circuit and is arranged to terminate the machine operation should cartridges be absent from the conveyor 100 for a predetermined period indicating a gap in cartridge supply.

The transfer mechanism has three principle elements for providing the above described operation.

The cartridge 29 is moved, as described above, by a vertical transfer rod 113 slidably mounted on a transfer carriage 114 in bearings 115 (FIG. 14). As best seen in FIGS. 7 and 14, the transfer rod 113 is raised and lowered by a linkage system 116 driven by a rotating cam mounted on the cam shaft 36 (FIG. 10) in the machine table 22 and which is driven in synchronism with the other driven portions of the machine. The transfer rod 113 is raised and lowered at appropriate intervals by the linkage 116 which is pivotally attached to a vertical cam rod 117 having a horizontal cam plate 118 at its upper end. As illustrated in FIG. 14, the vertical position of the transfer rod 113 in the carriage is controlled by the position of the cam plate 118 through the intermediation of the pivotally mounted cam follower cam 119 having a cam roller 120 on its outer end and being pivotally attached at 121 to the transfer carriage 114 at its opposite end.

While the above described coupling is providing the necessary vertical motion of the cartridge 29 on the transfer rod 113, the necessary horizontal travel of the support carriage 114 is provided by a horizontal mounting 122 for the carriage 114 (FIG. 7). The carriage mounting rod 122 is mounted in suitable spaced bearings 123 and is driven back and forth by a crank connection 124 with a second transfer cam mounted on the cam shart 36 and suitably shaped to move the carriage 114 in and out in timed relationship with the above described vertical movement.

A pair of cartridge gripping jaws 125 is mounted on the transfer rod 113 to engage the endmost cartridge 29 during the transfer and to release it at the plate 73. The jaws 125 are illustrated in FIG. 14. The jaws 125 are pivotally mounted at 126 with cartridge gripping projections 127 at their lower end. They are urged into gripping engagement with the cartridge 29 by springs 128 which urge the gripping projections 127 into engagement with the cartridge 29. The jaws 125 are moved to their open cartridge releasing position by the spaced cam rollers 129. The rollers 129 are moved downwardly by the roller mounting head 130 by an air motor 131 (FIG. 7) mounted on the top of the transfer rod 113 and coupled to the rollers 129 through the intermediation of the vertical drive rod 132 positioned within the hollow transfer rod 113. The air motor 131 is activated to open and close the jaws 125 at the proper intervals by the resolver.

Cartridge Cover Lift Position No. 2

Figures 23, 24:
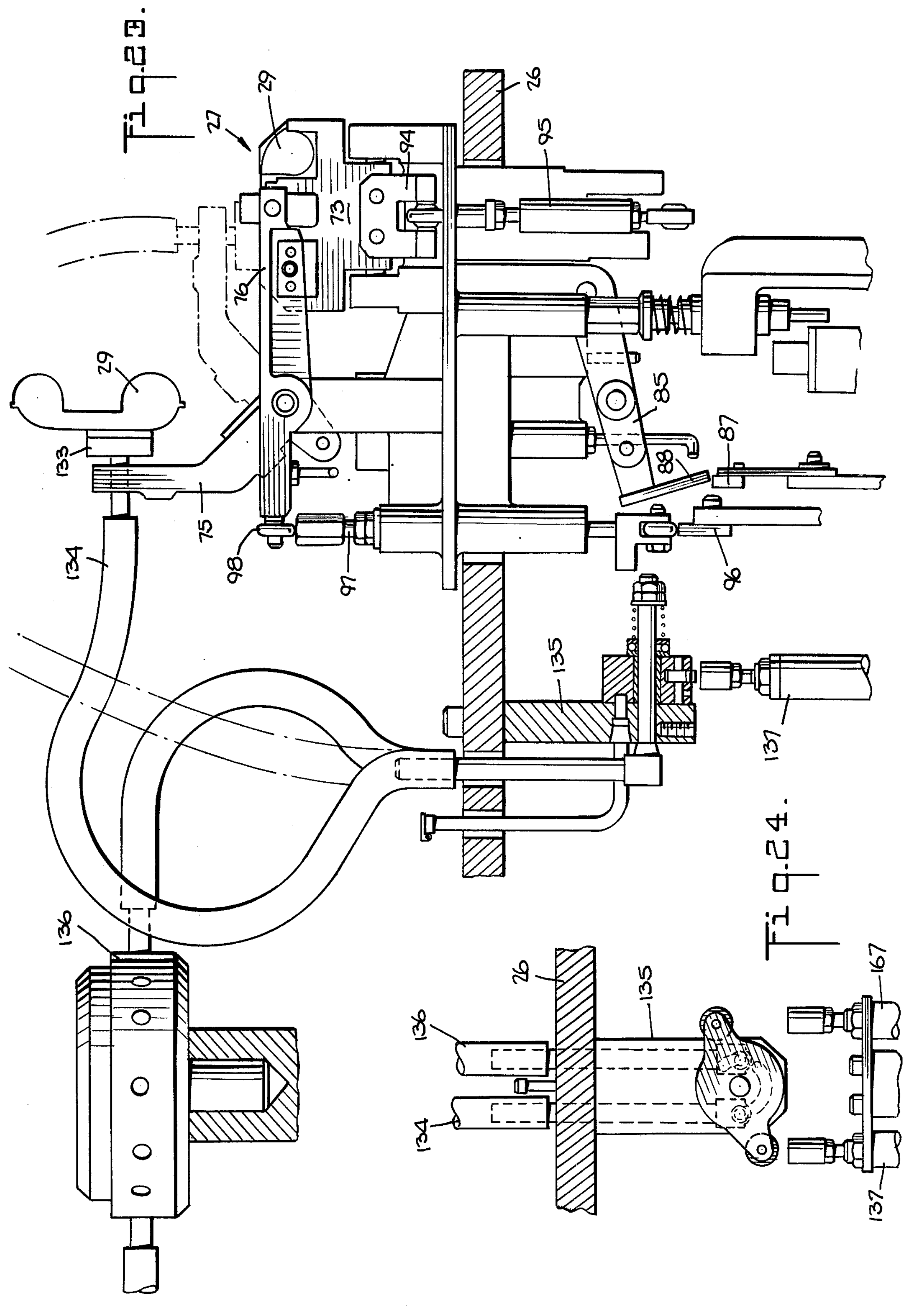
FIG. 23 is a side elevational view of the cartridge loading head and the operating means and vacuum system for the cartridge opening and closing.
FIG. 24 is a detailed elevational view of the vacuum control for the cartridge loading heads.
Figure 27:
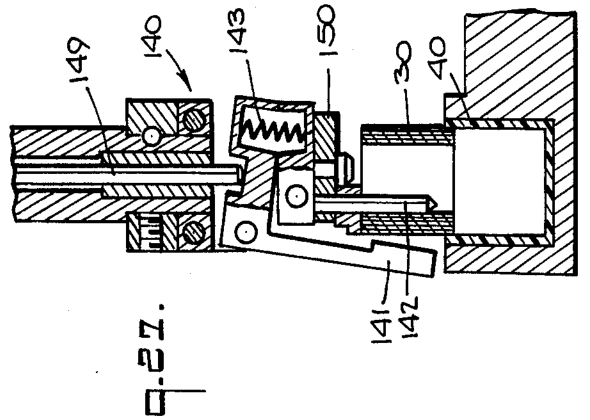
FIGS. 25 through 29 are enlarged detailed cross-sectional views illustrating a scroll transfer means for the scroll transfer stations shown in successive scroll transferring positions.

At position 2, the cartridge cover 47 is lifted from the cartridge 29 in the loading head 27. This is done by the vacuum lifter arm 75 which is activated as described above by stationary cam wheel 87 lowering the arm 75 to the cartridge cover 47. Vacuum is applied to the arm 75 through a vacuum cup 133 and a vacuum hose 134 (FIG. 23) which is coupled through an off-on switch 135 to the central vacuum manifold 136. The vacuum is switched on at position 2 by the operation of an air cylinder 137 which engages and rocks the vacuum switch 135 to its on position under the control of the resolver. During this period, the resolver also signals the cover shift arm 76 to pull the cover 47 clear of the cartridge body 40. The subsequent turret index moves the cam wheel 87 clear of the cam 88 and causes the cover lift arm 75 to rise.

First Scroll Transfer Position No. 3

At position 3, an interwound scroll 30 of film and backing paper is inserted into the scroll supply compartment 43 of the magazine body 40 with a backing paper leader 56 extending upwardly from the supply compartment 43. The scroll 30 is wound on a scroll winding assembly mounted adjacent to position 3. One suitable scroll winding assembly is illustrated, for example, in United States Patent No. 3,712,553 dated January 23, 1973. Such a scroll winder forms the interwound paper and film scroll on a suitable winding arbor for presentation to the magazine body 40 by a scroll transfer means.

At the scroll insertion position 3, each magazine 29 is opened with the supply compartment 43 of the cartridge body having an open side. The scroll 30 from the scroll winding machine must be inserted through the open side into the cartridge supply compartment 43. FIGS. 25 through 29 illustrate the relationship of the cartridge body 40 and a loading arm 140 of a scroll insertion means for this position. The loading arm 140 is mounted for first movement away from the scroll winding arbor and for a second axial motion towards a cartridge body 40 at the scroll insertion position 3 or 5.

Figure 25:
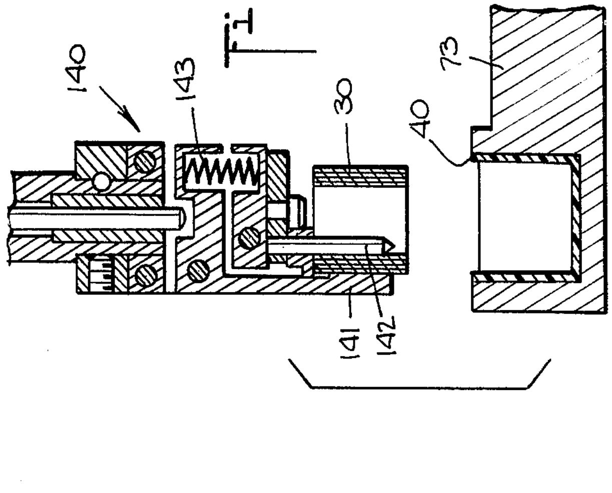
Figure 40:
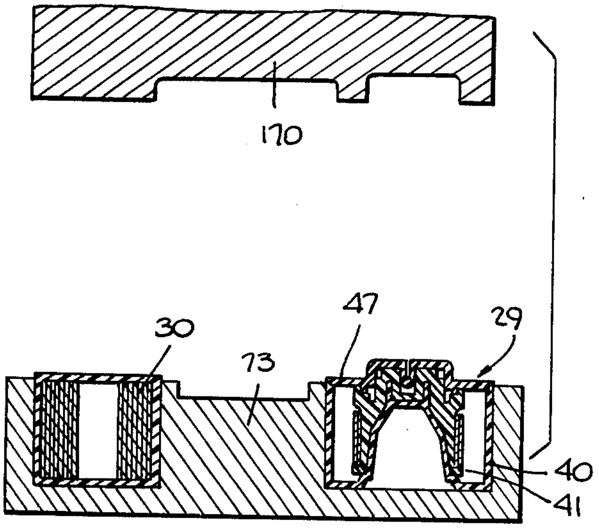
FIGS. 40 and 41 are horizontal sectional views illustrating two successive positions of the cartridge sealing head at the cartridge sealing position 9.
Figure 30:
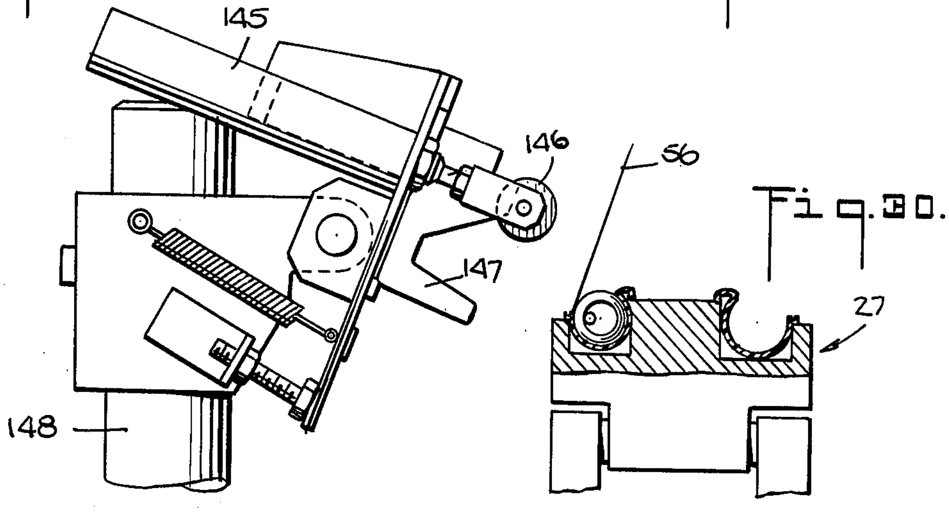
FIGS. 30 and 31 are side elevational views illustrating the scroll clamp at the scroll transfer stations in successive operating positions.
Figure 31:
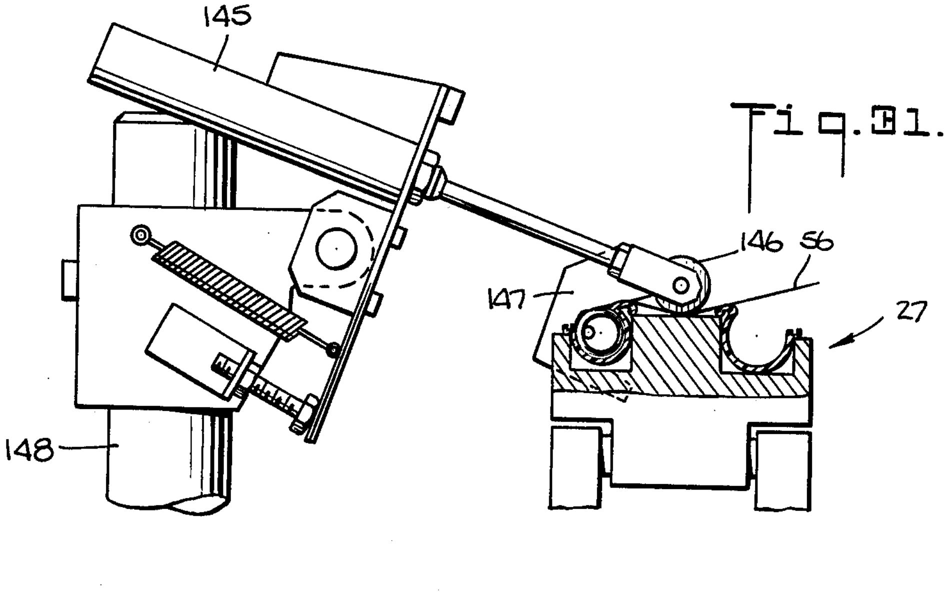

FIG. 25 illustrates the loading arm 140 of the insertion means being driven towards the cartridge body 40 in the nest plate 73. The loading arm 140 has scroll gripping jaw members at its end adjacent the cartridge body 40 comprising a jaw member 141 and a pivotally attached jaw pin 142. In FIG. 25, these members are in their closed scroll gripping position under the force of a compressed coil spring 143. The arm is advanced by the scroll winding system to the contact position shown in FIG. 26. In this position, the scroll has partially entered the supply compartment 43 and is ready to be transferred from the arm 140 to the cartridge body 40. At this time, a switch activated by the transfer position of the arm 140 energizes a paper clamp roller and back-up plate means 144 as illustrated in FIGS. 30 and 31. An air cylinder 145 is energized to move the clamp roller 146 and back-up plate 147 from their withdrawn position at support post 148 to a back-up position at the magazine body 40 as shown in FIG. 31.

Figure 28:
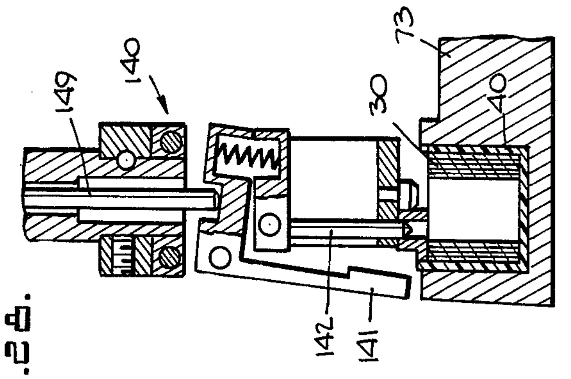
Figure 29:
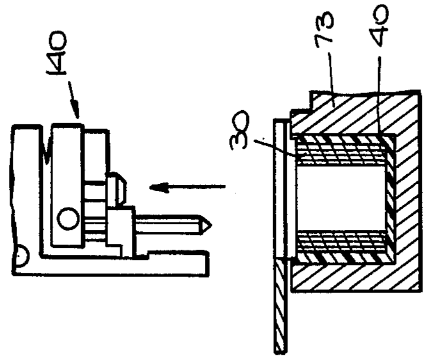
Figure 33:
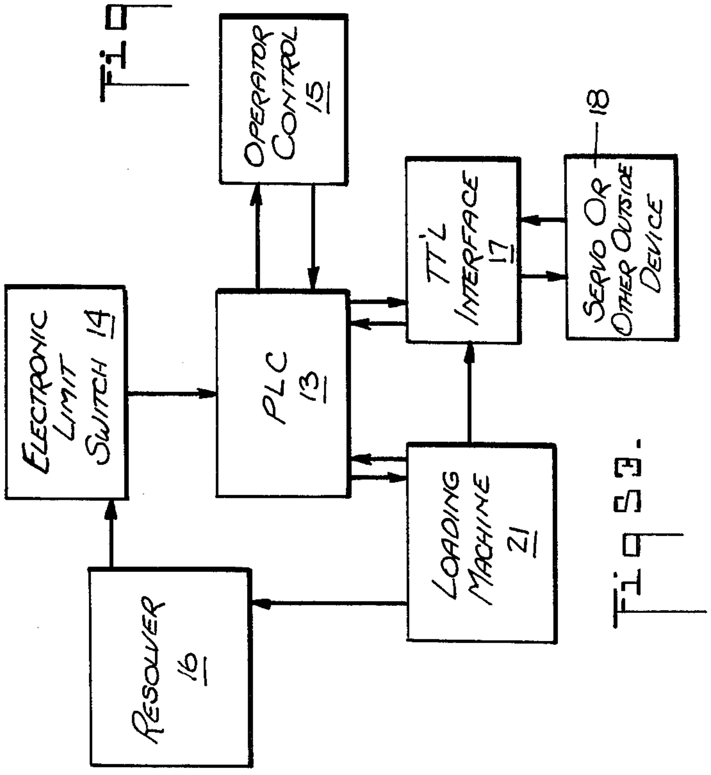
FIG. 33 is a side elevational view, partially in section, of the paper heat seal to spool head.
Figure 26:
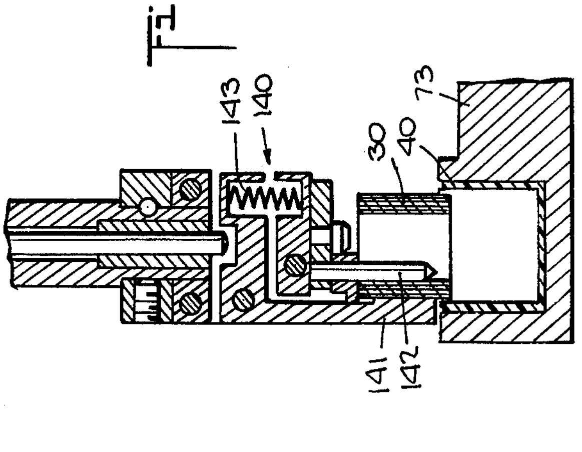

The scroll 30 is now moved into the supply compartment as the jaw member 141 is released by an activating pin 149 on the transfer arm 140. Relative movement of a pusher portion 150 on the transfer arm 140 carries the scroll 30 into the supply compartment 43, as seen in FIG. 28. The transfer arm 140 is now withdrawn as the scroll 30 is positioned in the supply compartment 43 of the cartridge with the paper lead 56 turned to and held against the nest plate 73 and with the back-up plate 147 preventing the scroll 30 from unwinding as it moves into the supply compartment 43. The operations of the various members described above are controlled in sequence by suitable limit switches positioned for activation by the members as they reach the various positions described. Resolver signals are also available for initiating the transfer arm withdrawal and the related sequence which reverses the above described steps preparatory to another scroll feeding cycle.

Position 4 may conveniently be left unused particularly where dual scroll winders are used for alternate feeds at positions 3 and 5. The position may be used, if desired, as a check position for a correct scroll feed at position 3.

Position 5 is identical to the above described position 3 and the scroll feeding is activated at this position for every other loading head by a marker means positioned at alternate loading heads 27.

Scroll Detector Position 6

Figure 32:
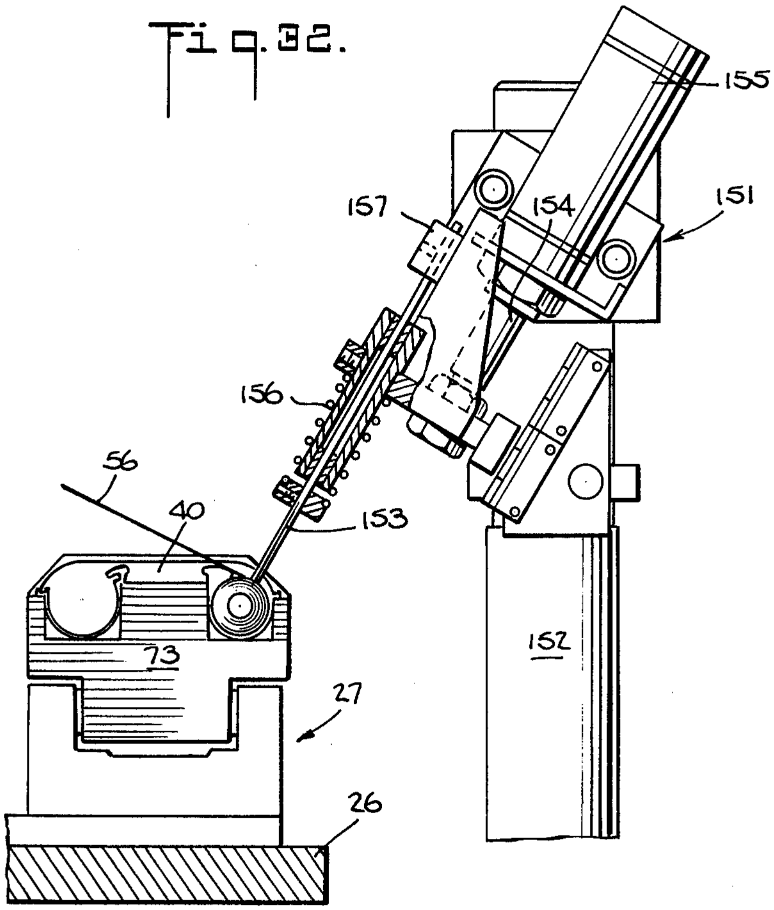
FIG. 32 is a side elevational view illustrating the scroll detector at position 6.

A check is made to determine whether a scroll is present in each cartridge body at position 6. A preferred embodiment of such a scroll detector is illustrated in FIG. 32. A sensing device 151 is mounted at this position on a suitable support rod 152 adjacent to the turret 26. A sensing rod 153 is slidably attached to the piston 154 of an air motor 155. After the indexing operation has brought the loaded cartridge body 40 to position 6, the air motor is activated by the resolver to lower the rod 153 into engagement with the scroll 30 in the cartridge body 40. If a scroll is present, the rod 153 is raised against the force of the compressed coil spring 156 so that switch 157 activates a scroll present signal for the Logic System permitting the system operation to continue. If no scroll is present, switch 157 will remain open generating a no-scroll signal for this loading head to terminate operations at succeeding positions. The resolver next sends a probe return signal.

Scroll Attaching Position 7

Figures 33, 34, 35, 36:
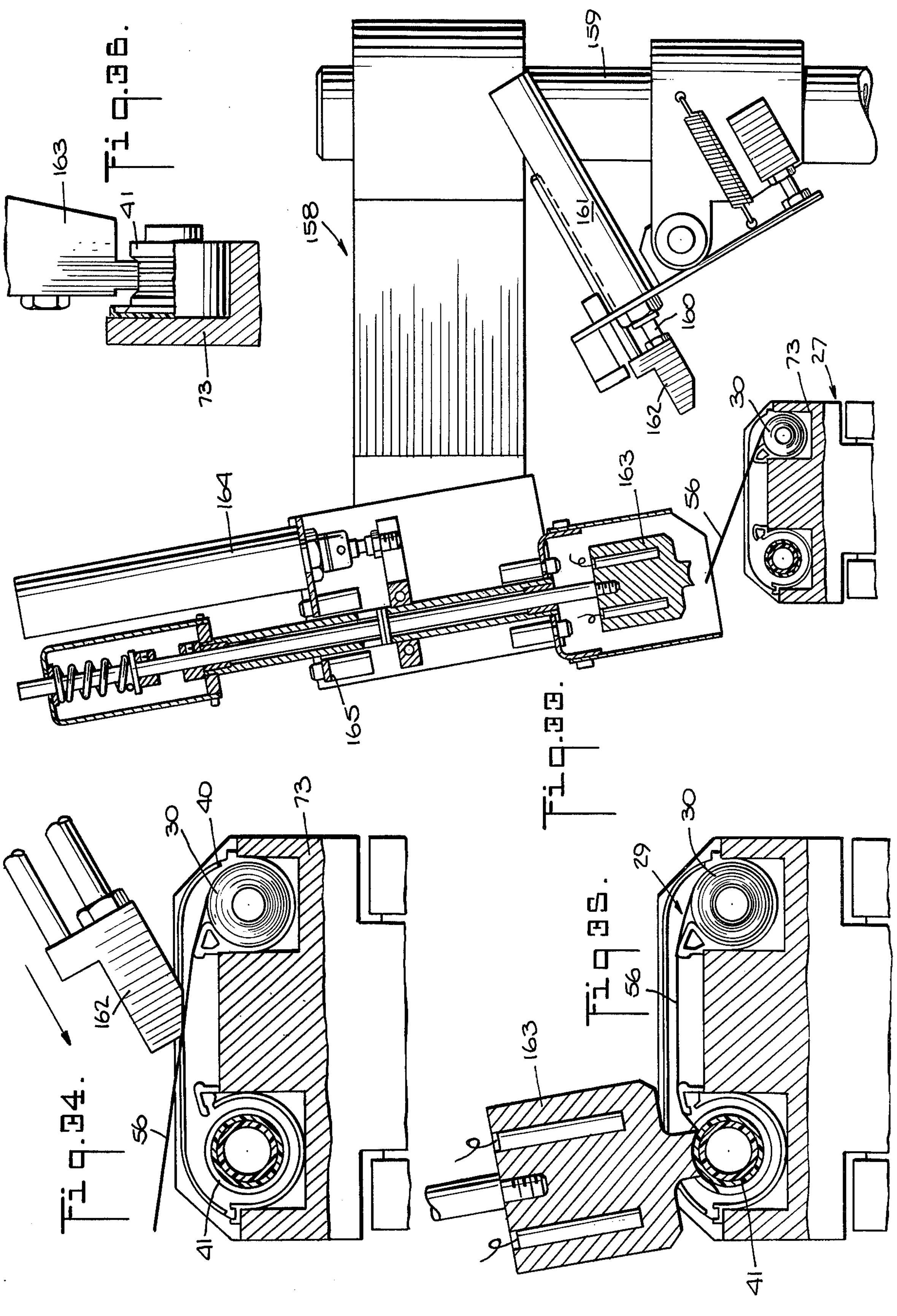
FIGS. 34 and 35 are enlarged side elevational views, partially in section, illustrating the paper clamp and the paper heat seal at position 7.
FIG. 36 is an enlarged detailed sectional view of the paper heat seal head.

At position 7, the backing paper leader 56 is attached to the take-up spool 41 in the cartridge take-up compartment 42. The attaching means 158 at this position is illustrated in FIGS. 33 through 36. The attaching means 158 is mounted on a suitable vertical support post 159. The means includes a hold-down arm 160 mounted on an air motor 161 which is activated by the resolver so that the hold-down finger 162 is moved against and engages and positions the backing paper leader 56 at the spool 41 as illustrated in FIG. 34. A heat sealing head or welding head 163 is then moved by means of a resolver signal for the air cylinder 164 so that the heat sealing head 163 forces the end of the leader 56 against the plastic take-up spool 41 welding or heat sealing the leader 56 to the spool 41. The heater head is held in its down or fastening position by a timer controlled by the switch 165. The resolver generates a release signal for the air motor 161 to lift the hold down arm 160.

The Cover Return Position 8

After the scroll 30 is attached to the take-up spool 41 at position 7, the loading head 27 is advanced by the turret 26 to the cover return position 8 where the cartridge cover 47 is reapplied to the loaded cartridge body 40. This is done by the reverse action described for the cover lift position 2. First, the resolver signals an air cylinder at position 8 to raise the drive rod 90 (FIG. 17) on the loading head 27 to shift the cover shift arm 76 to its open position. The cover arm 75 is lowered through the intermediation of its cam 88 and linking members 83 and 84 by a cam roller 87 to lower the cover 47 adjacent to the cartridge body 40. At this point, the vacuum switch 135 (FIG. 23) is closed by means of a resolver as the drive rod 89 is raised (FIG. 17 to rock the shift arm 79 moving the cover 47 axially of the cartridge body lip 55. The cover 47 has now been reapplied to the cartridge body 40 and the cover lift arm now returns to its normal raised position when the next index motion of the turret 26 carries that head 27 to the cartridge sealing position 9.

Cartridge Sealing Position 9

Figure 38:
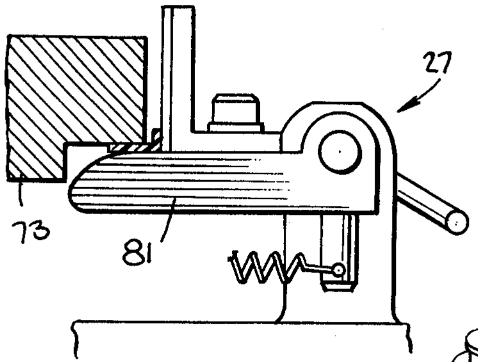
FIG. 38 (sheet 9) is a detailed side elevational view of the cover lever at the cartridge sealing position.
Figure 16:
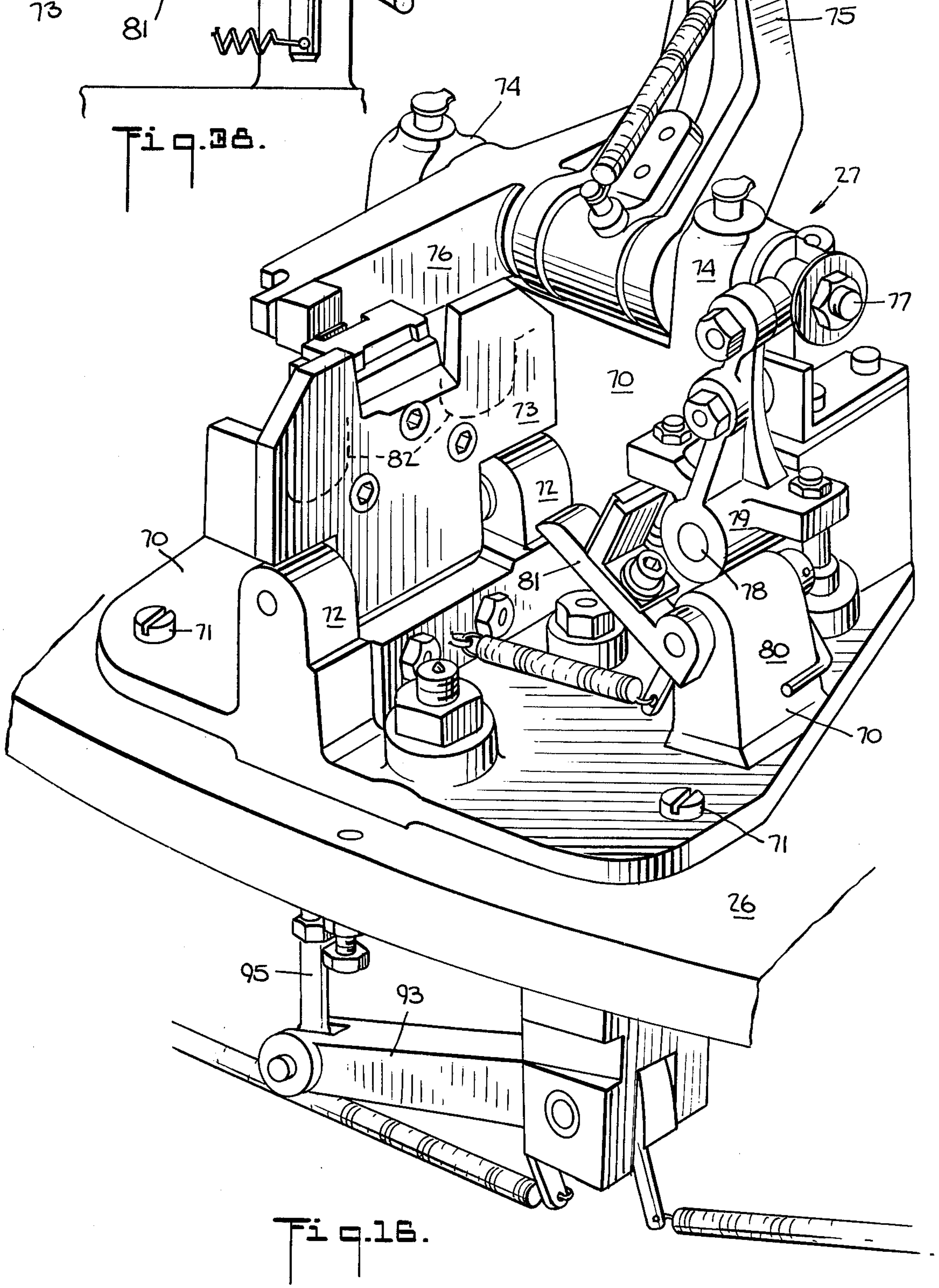
FIG. 16 is an enlarged detailed perspective view of a cartridge loading head.
Figure 41:
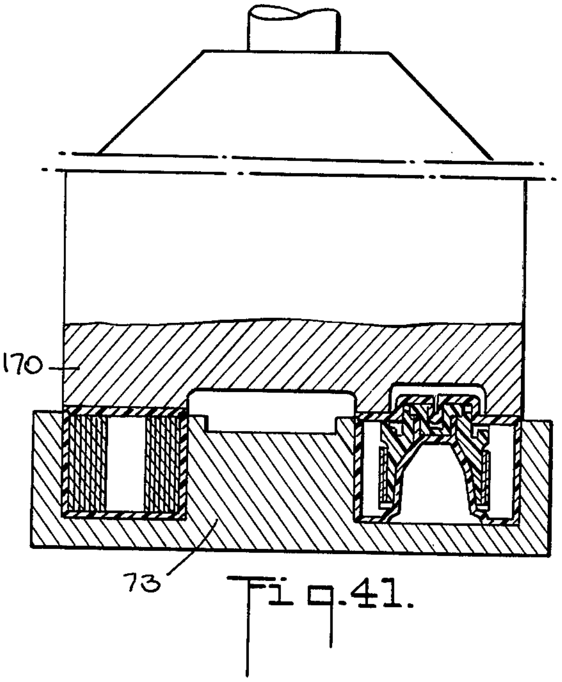
Figure 37:
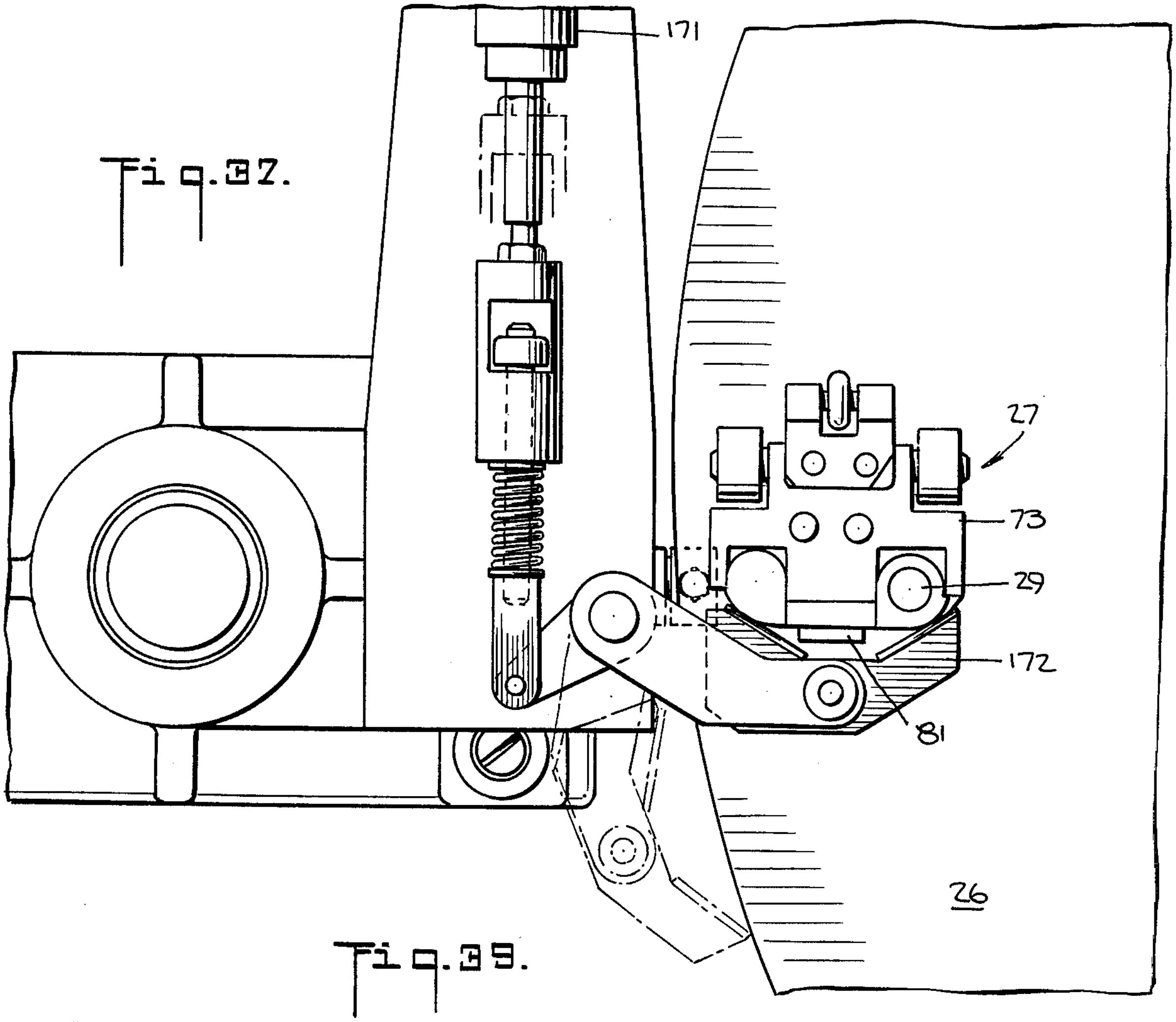
FIG. 37 is a top plan view of the cartridge sealing position 9.
Figure 39:
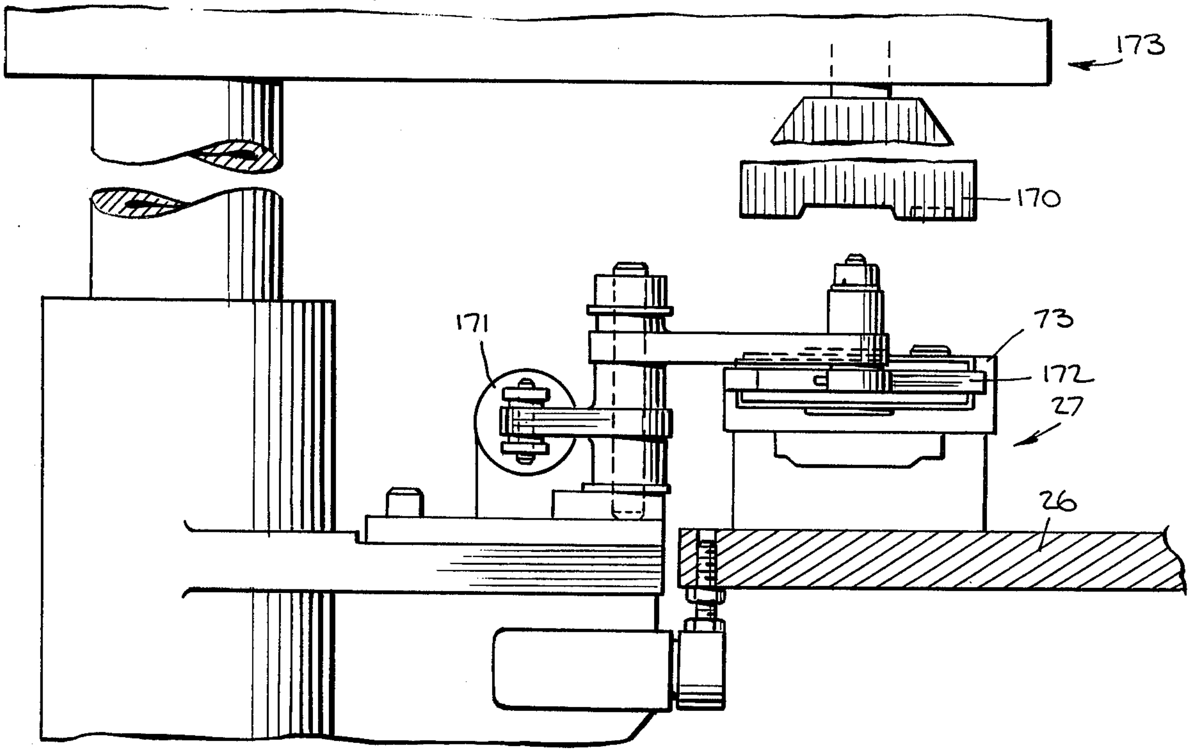
FIG. 39 is a side elevational view of the cartridge sealing position 9.

At position 9, the loaded and closed cartridge 29 is heat sealed. In order to facilitate the heat sealing, the nest plate 73 within the loading head 27 is turned to position the cartridge 29 so that its cover 47 end walls face upwardly towards a heat sealing head 170. The turning of the nest plate is accomplished through the intermediation of an elongated cam 94 as described above and as illustrated in FIG. 9 and FIGS. 17 and 18. A roller on the pivotally mounted tilt arm 93 (FIG. 17) engages the cam 94 so that the connecting link 95 turns the nest plate 73 in a clockwise direction from the vertical position illustrated in FIG. 17 to the turned down sealing position illustrated in FIGS. 37 and 39. The cover clamp 81 (FIGS. 16 and 38) holds the cover 47 against the cartridge body 40. The resolver also signals air cylinder 171 to move cover lock 172 against the cover 47 to insure a firm seating for the cartridge in nest 82 of the nest plate 73. The heat sealing head 170 is a portion of an ultrasonic sealer 173 which is signaled by the resolver to move down and to engage the edges of the magazine cover for a preset period and to weld or heat seal the adjacent plastic portions of the cartridge cover 47 and body 40 (FIG. 41). When the sealer 173 raises its sealing head 170, the resolver signals the air cylinder 171 to release the cover lock 172.

Torque Test and Wind-up Position 10

In order to prepare each of the loaded cartridges 29 for use in the camera, the film scroll 30 must be wound to a uniform starting position within the cartridge 29. This is done automatically at position No. 10 and at the same time, a winding torque test is performed to reject cartridges having excess winding torque which would be inoperative in the camera.

Figure 46:
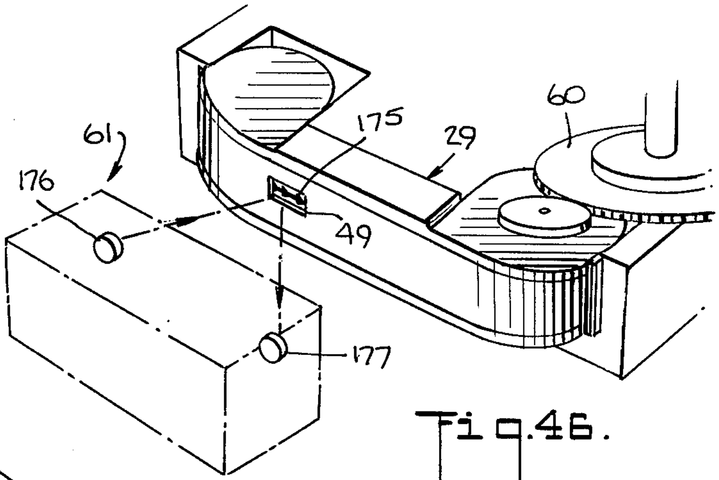
FIG. 46 is a perspective view illustrating the photoelectric control for the torque testing position 10.

The winding assembly at position 10 is illustrated in detail in FIGS. 42 through 47. FIG. 46 is a perspective view illustrating a cartridge 29 in its wind-up position. The cartridge 29 is positioned within the nest 82 with the winding gear 60 operatively engaged with the winding gear 54 on the cartridge spool 41. Small indices such as triangles 175 on a contrasting background are provided on the backing paper portion of the film scroll 30. The indices become visible through the cartridge aperture 49 when the film has been wound to its start position.

FIG. 46 illustrates a photoelectric means 61 with a light source 176 and photocell 177 detecting the presence of the indices 175 to generate a control signal for terminating the below described winding operation and torque test.

The winding assembly is mounted on a bracket 178 on the machine turret 26. A support arm 179 is pivotally attached to the bracket 178 at 180. The winding gear 60 best illustrated in FIG. 43, is mounted on a bracket 182 pivotally attached at 183 to the arm 179. The winding gear 60 mounted in a bearing block 187 is coupled to the winding motor 181 through the intermediation of a shaft 184, pulleys 185, and a drive belt 186. A brake 188 is mounted on the upper portion of the gear shaft 184 which is energized at the termination of the winding and a torque determining clutch 189 is positioned near the brake 188. The clutch 189 sets the normal film winding torque so that winding does not occur or occurs too slowly in the event that a particular cartridge has a faulty scroll or spool arrangement which may not be wound or which may be wound only with torque considered excessive for cameras. This results in a reject signal as described below.

Figure 44:
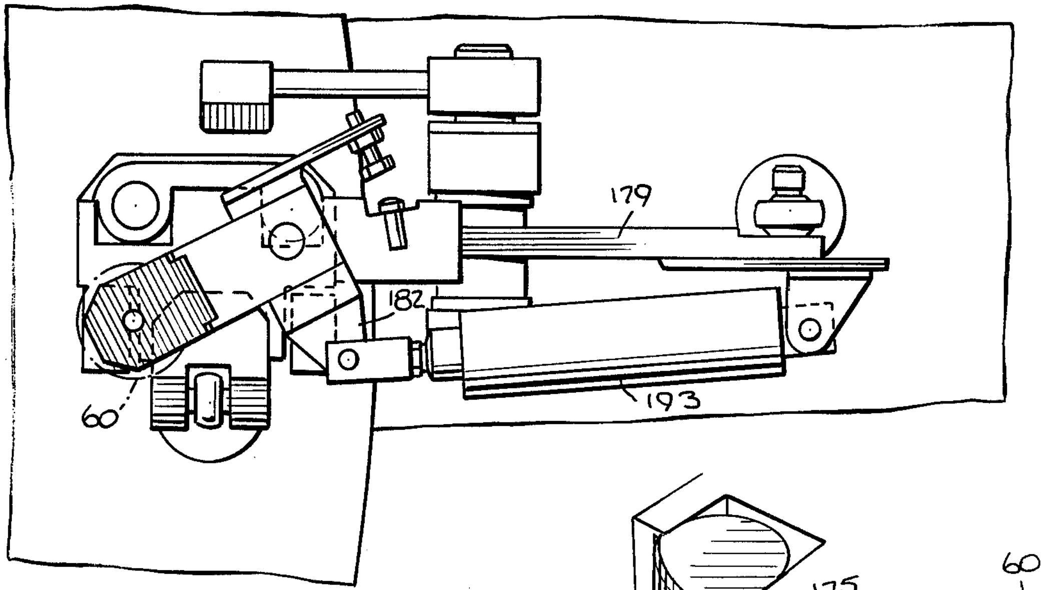
Figure 42:
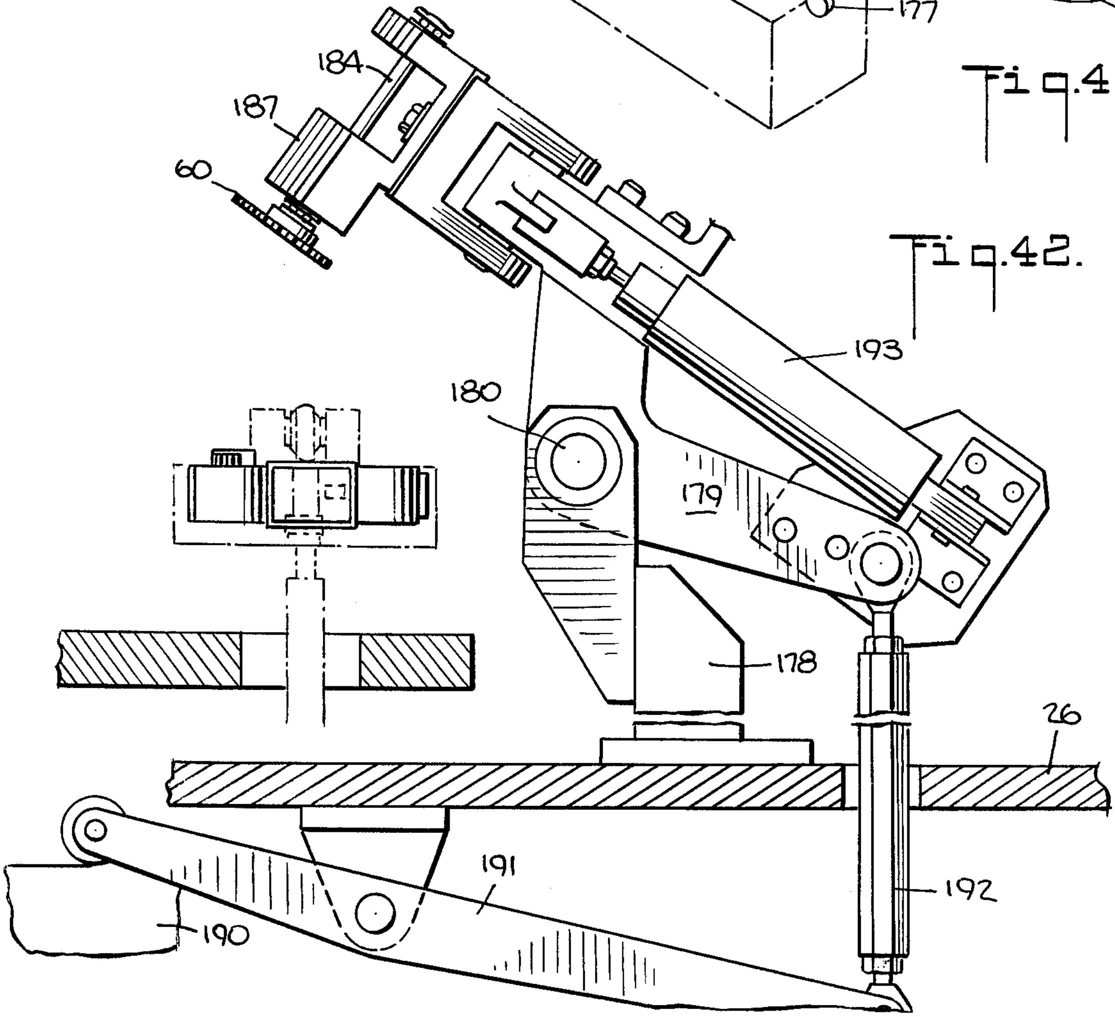
FIG. 42 is a side elevational view of the wind-up and torque testing position 10.

As soon as the turret 26 has been indexed to position 10, the winder assembly arm 179 is swung down from its disengaged position of FIGS. 42 and 44 to its winding position of FIGS. 43, 45 and 47 through the intermediation of a cam 190 on the machine cam shaft 36 (FIG. 10). The cam 190 is coupled through a rocker arm 191 and an adjustable linkage 192 to the support arm 179. After the winder gear 60 has been lowered by arm 179, the winding gear 60 is moved laterally into engagement with the cartridge gear 54 by the movement of the bracket 182 by an air motor 193 operated by a signal from the resolver. The resolver next provides the winding signal for the drive motor 181 including a momentary high initial starting torque. Winding continues until the photocell 177 detects the above described indices 175 at which point the photocell 177 signal terminates the winding torque and applies the brake and retracts the air cylinder. The mechanical cam 190 which lowered the winder assembly arm 179 now operates to raise it back to its disengaged position of FIG. 42.

The photocell detector 61 is also employed as a high torque detection system. If no fully wound signal results from the arrival of indices 175 at the cartridge operture 49 in the allowed winding interval, an override signal is fed from the resolver to the winding motor 181 and brake 188 and air cylinder 193 to terminate the winding attempt and to clear the winding assembly for its disengagement by means of the mechanical cam 190. This same override signal places a reject mode into the reject system to insure that this faulty cartridge 29 is rejected at the discharge position 12.

Figure 8:
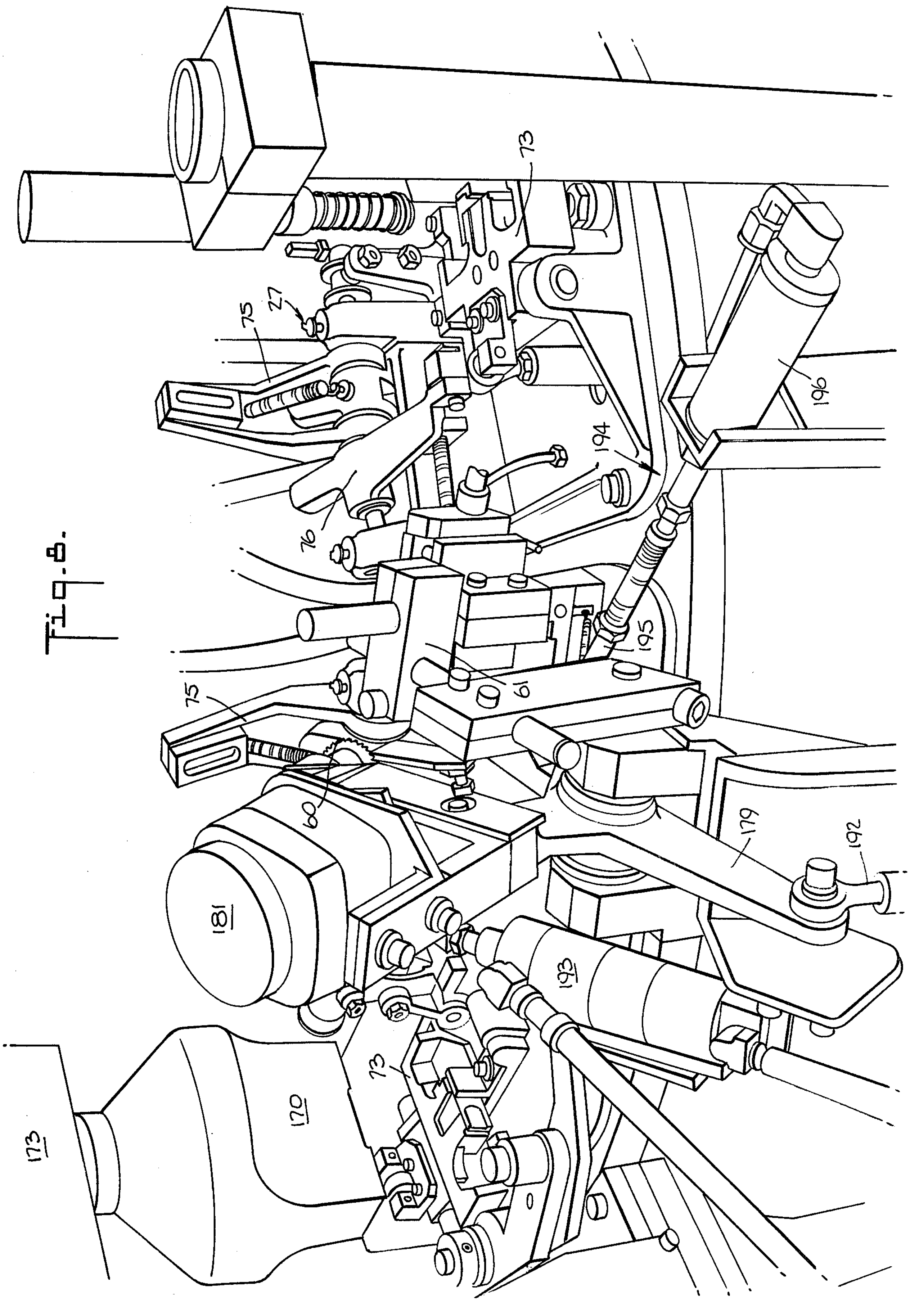
FIG. 8 is a fragmentary perspective view of the torque testing and cartridge marking stations of the apparatus in accordance with the invention.

Occasionally during a cartridge sealing at position 9, an unintentional connection may be made between some portion of the film scroll 30 and the magazine 29 walls. This connection may be released by lightly tapping the cartridge 29. The cartridge 29 is automatically tapped at the winding position 10 by a tapper 194 as illustrated in FIGS. 8 and 45. The tapper 194 has a tapping head 195 mounted on an air cylinder 196 in position to engage the cartridge 29 which is energized by a pneumatic valve under the control of a mechanical cam on the cam shaft 35 and which is adjusted to perform the tapping action as the cartridge 29 is moved into position 10 and prior to the above described winding and torque testing steps.

Cartridge Marking Position 11

As described above, the cartridges 29 are loaded with scrolls 30 of interwound film and paper and a preferred embodiment provides for the use of two separate and identical scroll winding machines which feed the scrolls to alternate loading heads. Since faults in the completed cartridges may relate to the wound scrolls 30, it is desirable that the completed cartridges 29 be marked to indicate which of the two scroll winding machines has furnished a scroll 30 for a particular cartridge. This marking is performed at position 11 where cartridges fed by scroll winder 1 at position 3 are marked.

Figure 48:
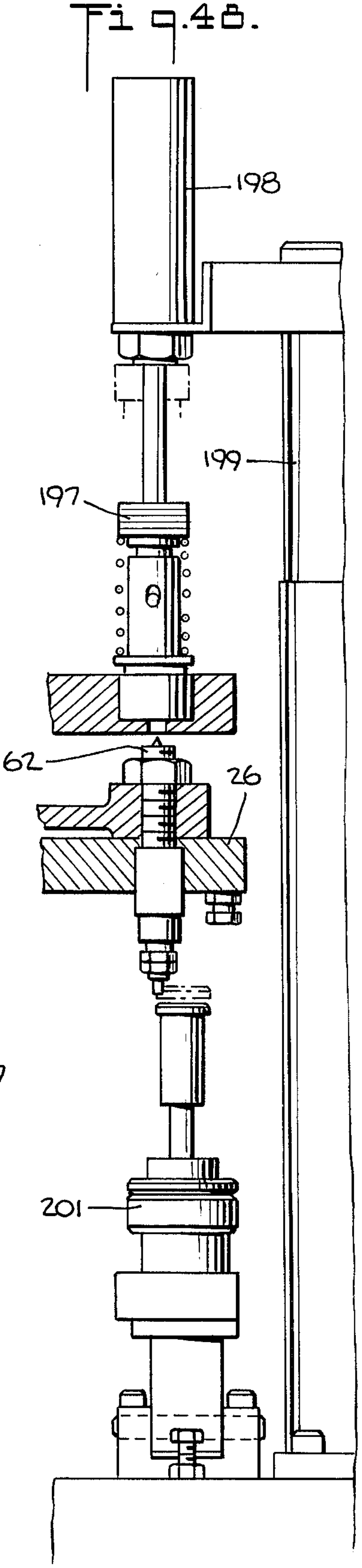
FIG. 48 (sheet 16) is a side elevational view of the cartridge marking position 11.
Figure 49:
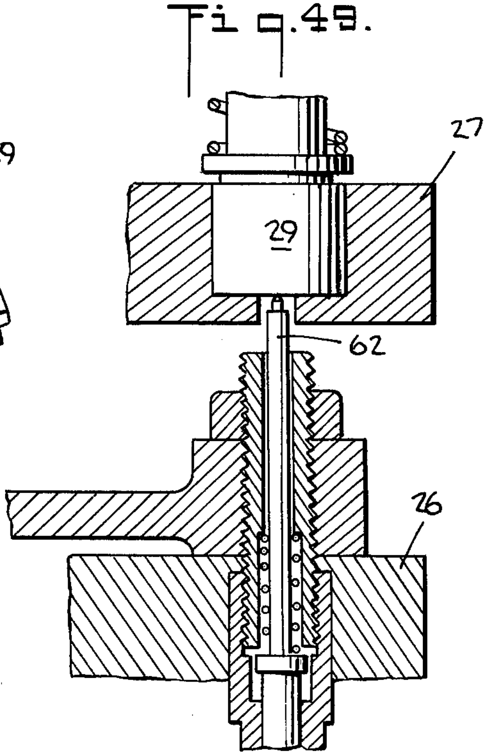
FIG. 49 (sheet 16) is an enlarged detailed view of the marking tool.
Figure 50:
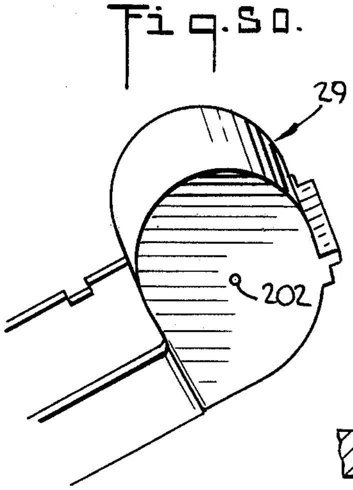
FIG. 50 (sheet 16) is a perspective view illustrating a marked cartridge.

A preferred embodiment of the marking means is illustrated in FIGS. 48, 49 and 50. At this position, a resilient holddown head 197 is moved into engagement with the sealed cartridge 29 by an air motor 198 mounted on a vertical support 199. The activating signal for the air motor 198 is provided by the resolver. When the head 197 is in position the resolver now energizes a marking or scribe tool 62 by energizing a one-shot air motor 201 to cause the scribing tool 62 to emboss the magazine 29 face as illustrated at 202 in FIG. 50. A marking tool is provided at every other head 27, i.e. those fed by the scroll winder at position 3 and the tool energizing signal from the resolver is limited to every other head by the marking block means which also controls the alternate scroll feed described above. The resolver then provides a signal to retract the backup motor 198 which activates an all clear switch (not shown) to permit the indexing operation to continue.

A shift register may also be used, as set by the position 3 scroll loading, to control the operation of the embossing tool for only every other head 27 so that the cartridge 29 which is marked may be associated with only one of the two scroll winding machines, i.e. the one feeding scrolls to the cartridges at position 3.

The Cartridge Unload Position 12

Figures 51, 52:
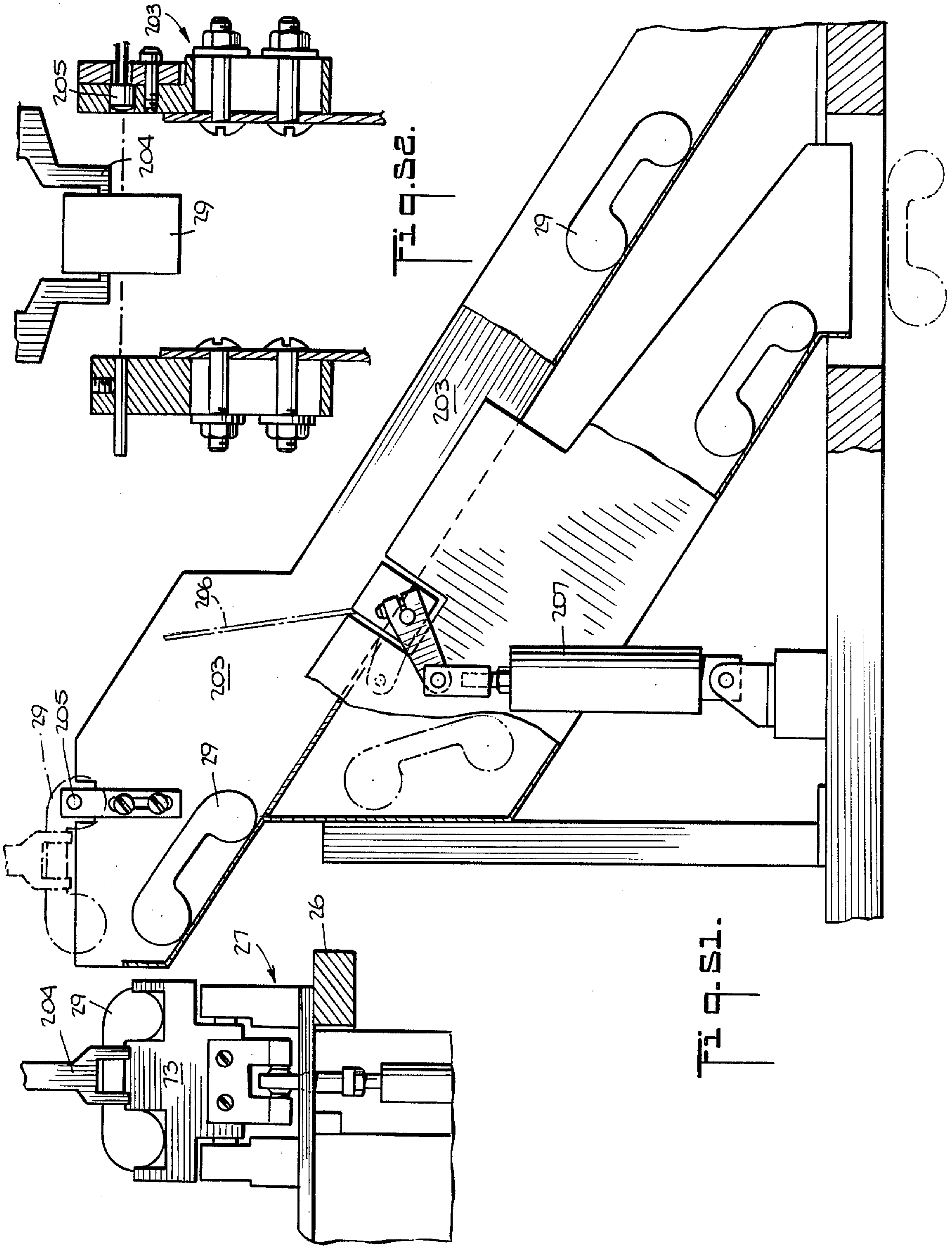
FIG. 51 is a side elevational view, partially in section, of the cartridge unloading position 12.
FIG. 52 is an enlarged detailed vertical sectional view of the cartridge loading position 12.

At the unloading position 12 (FIGS. 51 and 52), the loaded and sealed cartridges 29 are removed from the heads 27. The defective cartridges are separated and are unloaded into a separate container. The unloading position includes cartridge transfer means 208 generally similar to that described for the cartridge loading position 1 which operate in a reverse sequence to lift the cartridges 29 from the nests 82 and to drop them into a discharge chute 203.

A first mechanical cam or cam shaft 35 raises and lowers the jaws 204 toward and away from the nest 82 for the pick-up while a synchronized second cam on shaft 35 moves the jaws 204 towards and away from the discharge chute 203 when the jaws 204 are in their raised position. The jaws 204 are opened and closed to grip and to release the cartridges at the proper interval by signals from the resolver by a mechanism similar to that at the cartridge loading position 1. A photocell 205 detects the released cartridge to provide an unload signal whose absence provides a warning that no cartridge was unloaded.

The cartridge exit chute includes a trap door 206 which is opened and closed by an air motor 207. When a defective cartridge 29 reaches position 12 for removal from the machine, the trap door 206 opens whenever a defective cartridge signal has been placed in the shift register in any one of the fault detecting positions associated with that head such as an excess winding torque signal from position 10. In the absence of a fault signal the trap door 206 is closed at the beginning of each indexing period in the absence of a reject signal.

Figure 18:
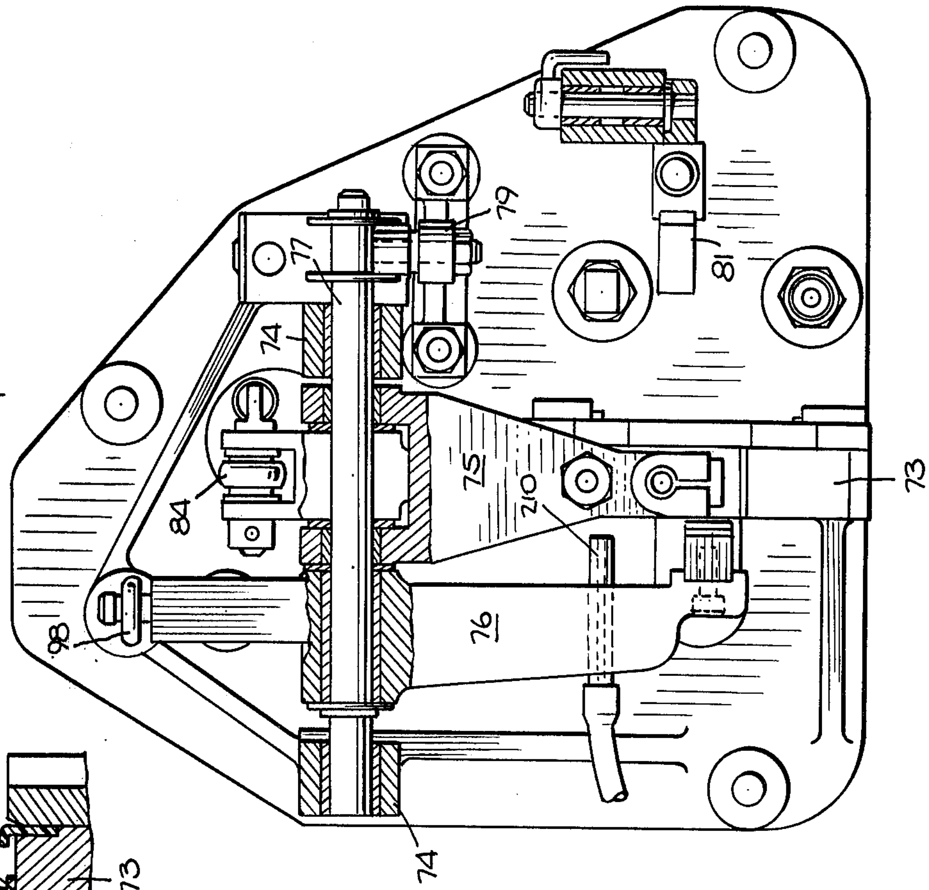
FIG. 18 is a top plan view, partially in section, of a cartridge loading head.
Figure 22:
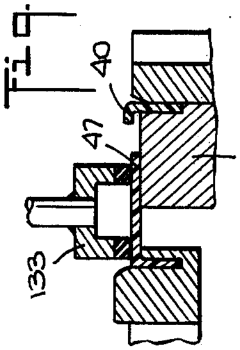
FIG. 22 (sheet 10) is a detailed sectional view of the cartridge cover lifting head.
Figure 17:
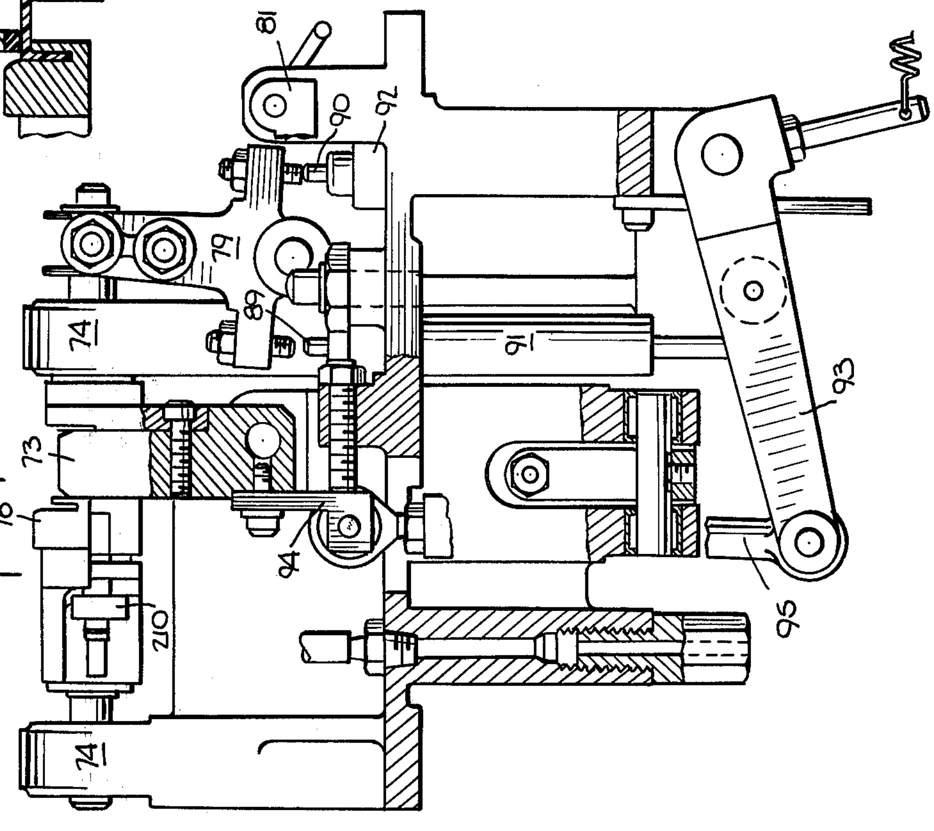
FIG. 17 is a front elevational view, partially in section, of a cartridge loading head.

While the cartridge is opened at positions 2, 7 and 8, it is necessary that the pick-up spool 41 within the cartridge body 40 remain in its normal position within the take-up compartment of the cartridge body 40. An air blow system is employed for this purpose. This system includes an air nozzle 210, as illustrated in FIGS. 17 and 18, which is mounted on each cover shift arm 76 in position to direct an air stream against the spool 41 while the cartridge 29 is opened or through the cartridge opening 59 when the cover is in place. The air nozzle 210 is coupled by a hose 211 to an air coupling 212. A suitably positioned stationary coupling 213 (FIG. 10) engages the couplings 212 at positions 2, 7 and 8 to receive an air blast for the nozzles 210 under the control of an air supply valve by a valve operated by a suitable cam on the cam shaft 35.

THE DIGITAL SERVO FEED AND WINDING

FIG. 53 illustrates a novel digital servo feeding and winding system at 17 and 18. The servo system is used to operate paper feed, film feed and wind up motors for the scroll winding at a winding arbor. The selection of each motor and the length of paper feed, film feed and consequent winding is determined by the preset TTL logic. A shift register on the TTL interface 17 determines the length by choosing a certain number of counts. A TTL start pulse to the servo 18 starts the motors and after a predetermined count, stops it. After the motor has stopped, an "IN POSITION SIGNAL" is generated to further process the logic and to control the completion of the scroll winding cycle.

The film feed is done with the digital servo thereby eliminating the need for a toothed, fixed pitch length sprocket driving wheel for fixing the length of film fed. In this way, the machine can be readily changed over to feed either 12 exposure or 20 exposure film or other film lengths.

The paper feed is similarly done with a digital servo giving an excellent control of the paper length for either 12 exposure or 20 exposure film cartridges.

The scroll winding is done with the digital servo to provide an exact registration between the film and the paper that which has been a problem in all previous machines. The use of the digital servo systems in these three drives provides the ability to choose exact velocity-position relationships which provide a unique control contributing to perfect winding results and uniformly acceptable scrolls.

It will be seen that an improved cartridge loading machine has been provided which is particularly adapted for loading film cartridges of the type where a removable cartridge cover requires at least some axial movement being removed and replaced on the cartridge body. An improved high speed and relatively simple and automatic machine and method is described for handling and for loading cartridges of this type.

In addition, an improved automatic system as described in detail above employs logic systems where a number of signals from resolvers and sensing means and operator actuated control may be coordinated and logically combined in the logic systems channels for machine control.

The machine is primarily controlled by a commercially available programable logic controller. The input information to the P.L.C. is processed internally according to predetermined ROM logic sequence. Details of this logic sequence are programmed for the particular one of the operations being controlled as described above. Logically processed input information to the P.L.C. generates output power or pulses which in turn energize solenoids and interface elements used in the operation of the machine.

The input information to the P.L.C. is derived from the three different sources indicated, i.e. the programable electronic limit switch, the selector switches, pushbuttons and toggle switches serving as the human interface and the limit switches and infrared photo detecting devices that determine the instantaneous status of each machine element. The output devices on the P.L.C. are transistors or triacs which energize the various solenoids and coils or which generate levels of voltages or pulses for the various interface elements in the system.

The tolerance requirements on the film and paper relationship within assembled cartridges necessitate the use of the high resolution, closed loop, digital servo system. The information on the instantaneous status of the film and paper is transmitted to the servo system by various infrared photo detecting devices and TTL interface, and according to predetermined programming of the servo system accurate lengths of film and paper are fed and wound. The response time of the servo system is in order of a few micro seconds while that of the P.L.C. is 40 milliseconds. The P.L.C. therefore cannot process the multiplexing logic for the servo system. In order to process the multiplexing logic based on the information received from various infrared photo detecting devices and switches the TTL interface is used.

This system of the present machine, utilizing only a minimal number of direct contact switches, avoids the wear and corrosion problems and the other timing and adjusting problems characteristic of such direct sensing controls and provides a scroll winding operation of great accuracy.

The improved control system of the present machine and its simplified mechanical operation also adapt it for reliable operation in a dark or reduced light room which is characteristic of film cartridge loading operations. The use of the improved electronic control system also makes the system adapted for numerous and strategically positioned visible warning lights or signals so that all phases of the machine may be continuously monitored and so that interruptions or failures may be instantly diagnosed.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. An improved cartridge loading means for inserting film scrolls into cartridges having removable covers comprising the combination of:

a loading head;

a movable support for presenting said head to a plurality of loading positions;

means for driving said support;

a nest having a cartridge receiving means thereon and being movably mounted on said loading head;

means for moving said nest from a first attitude with the cartridge cover positioned upwardly to a second attitude on said loading head with the cartridge side walls positioned upwardly;

means for removing and for reapplying covers from a cartridge in said nest and for inserting the film scrolls when said nest is in its first attitude; and means for sealing the cartridge covers to the cartridges when said nest is in said second attitude.

2. The cartridge loading means as claimed in claim 1 in which said means for removing and for replacing the cartridge covers comprises first means for removing the cover in one direction away from the remaining portion of the cartridge and a second means for thereafter moving the cover an additional distance in a second direction.

3. The cartridge loading means as claimed in claim 1 which further comprises a plurality of loading heads mounted on said movable support, and means for presenting alternate loading heads on said support to alternate scroll loading positions.

4. The cartridge loading means as claimed in claim 1 in which said movable support comprises a rotatably mounted turret including means for intermittently indexing the turret from position to position.

5. The cartridge loading means as claimed in claim 4 which further comprises means operatively coupled to said index means for generating a control signal which varies in accordance with the progression of the turret indexing cycle.

6. The cartridge loading means as claimed in claim 5 in which said signal generating means comprises a resolver.

7. The cartridge loading means as claimed in claim 1 in which said means for sealing the cartridge covers to the remaining portion of the cartridges comprises a supersonic cover sealing means.

8. The cartridge loading means as claimed in claim 7 which further comprises means for tapping said sealed cartridges for releasing a scroll inadvertently attached to the cartridge.

9. The cartridge loading means as claimed in claim 1 which further comprises take-up spools positioned in said cartridges.

10. The cartridge loading means as claimed in claim 9 in which said cartridge loading means includes attaching means for connecting said film scrolls to said take-up spools.

11. The cartridge loading means as claimed in claim 10 in which said loading means includes a torque test position including means for winding said scroll partially onto said take-up spool.

12. The cartridge loading means as claimed in claim 9 which further comprises air nozzles positioned on said loading means for holding said spools within the cartridges during the cartridge loading operations.

13. The cartridge loading means as claimed in claim 1 in which at least some of said loading positions include means for sensing cartridges and portions of cartridges and said sensing means including a cartridge reject means.

14. The cartridge loading means as claimed in claim 1 in which said means for inserting the film scrolls comprises a movably mounted arm, means for moving said arm successively in differing directions, jaw means mounted on an outer end of said arm including means for opening said jaws responsive to the positioning of the arm adjacent to the cartridge.

15. The cartridge loading machine as claimed in claim 14 in which said arm moving means includes means for inserting a scroll at least partially within a cartridge prior to the release of the scroll from said jaw.

16. The cartridge loading machine as claimed in claim 14 which further comprises means for controlling the movements of said arm responsive to the position of said movable support.

17. An improved means for loading film cartridges with film scrolls comprising the combination of:

a plurality of cartridge supporting nests;

a movable support for said nests for advancing said nests to a plurality of spaced cartridge loading positions;

means to periodically index the nests from position to position in indexing periods of uniform duration;

means operatively coupled to said indexing means for generating a control signal proportioned to the time expired in an indexing period;

a programmable logic control having a plurality of channels for generating control signals;

switch means electrically coupling said control signal generating means to said programmable logic control for applying control signals to the programmable logic channel inputs in accordance with the elapsed time in the indexing period; and means coupling the output of said programmable logic control to cartridge loading means at said loading positions.

18. The cartridge loading means as claimed in claim 17 in which said control signal generating means comprises a resolver.

19. The cartridge loading means as claimed in claim 17 in which said control signal generating means comprises a digital encoder.

20. The cartridge loading means as claimed in claim 17 in which said switch means comprises an electronic limit switch.

21. The cartridge loading means as claimed in claim 17 which further comprises an auxiliary scroll winder coupled to said programmable logic control.

22. The cartridge loading means as claimed in claim 21 in which said coupling between said programmable logic control and said scroll winder comprises a as a transistor transistor logic.

23. The cartridge loading means as claimed in claim 17 which further comprises a cam means operatively coupled to said indexing means, and means operatively coupling said cam means to cartridge loading means at said loading position.

24. The cartridge loading means as claimed in claim 17 in which one of said spaced cartridge loading positions comprises a cartridge marking means.

25. The cartridge loading means as claimed in claim 24 in which said loading position comprises a pair of spool insertion positions including means at one insertion position for inserting scrolls into cartridges in alternate nests and means at the other insertion position for inserting scrolls in the remaining nests.

26. The cartridge loading means as claimed in claim 25 which further comprises means for marking cartridges in alternate nests.

27. The cartridge loading machine as claimed in claim 17 which further comprises means for winding said film scrolls including paper feeding and film feeding and scroll winding means controlled by a servo winding motor control.

28. The cartridge loading machine as claimed in claim 27 in which said servo includes means for controlling the feeding and winding in accordance with an adjustable pre-set count or analog signal for said servo.

29. An improved method for loading film cartridges with film scrolls comprising the steps of:

loading cartridges successively into a plurality of spaced cartridge supporting nests;

indexing said nests successively and periodically to a plurality of scroll loading positions;

generating an electrical control signal in synchronism with the running of the indexing period of said nests whereby the control signal is proportional to the expired portion of the indexing period; and coupling said control signal to a programmable logic control to control the operation of the scroll loading positions in accordance with the indexing.

30. The method as claimed in claim 29 in which the generation of the electrical control signal comprises generating a voltage whose value proportional to the expired portion of the indexing period.

31. The method as claimed in claim 29 in which the generation of the electrical control signal comprises forming a digital number proportional to the expired portion of the indexing period.

32. The method as claimed in claim 29 which further comprises controlling portions of the operations at the scroll loading positions from cams operatively coupled to the indexing of the nests.

33. The method as claimed in claim 29 which further comprises testing the cartridges for the presence of a scroll at one or more scroll loading positions.

34. The method as claimed in claim 29 which further comprises testing the loaded cartridges for the film winding torque.

35. The method as claimed in claim 29 which further comprises rejecting cartridges having excess scroll winding torques.

36. The method as claimed in claim 29 which further comprises controlling an auxiliary scroll winder from the programmable logic control.

* * * * *